US012567068B2

(12) United States Patent
Rubin et al.

(10) Patent No.: US 12,567,068 B2
(45) Date of Patent: Mar. 3, 2026

(54) DEVICES, SYSTEMS, AND METHODS FOR ENHANCING TRANSACTIONS VIA A BLOCKCHAIN NETWORK

(71) Applicant: Visa International Service Association, San Francisco, CA (US)

(72) Inventors: David Rubin, London (GB); Samuel Oliver, London (GB); Sarah Verry, Värmdö (SE)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 19/109,719

(22) PCT Filed: Sep. 28, 2023

(86) PCT No.: PCT/US2023/075423
§ 371 (c)(1),
(2) Date: Mar. 7, 2025

(87) PCT Pub. No.: WO2024/073602
PCT Pub. Date: Apr. 4, 2024

(65) Prior Publication Data
US 2026/0004293 A1     Jan. 1, 2026

Related U.S. Application Data

(60) Provisional application No. 63/377,649, filed on Sep. 29, 2022.

(51) Int. Cl.
*G06Q 20/40* (2012.01)
*G06Q 20/36* (2012.01)

(52) U.S. Cl.
CPC ....... *G06Q 20/401* (2013.01); *G06Q 20/3678* (2013.01); *G06Q 2220/00* (2013.01)

(58) Field of Classification Search
CPC ............. G06Q 20/401; G06Q 20/3678; G06Q 2220/00
See application file for complete search history.

(56) References Cited

U.S. PATENT DOCUMENTS

| | | | | |
|---|---|---|---|---|
| 9,990,626 B1 * | 6/2018 | LaBanca, Jr. | ......... | G07F 19/207 |
| 10,552,819 B1 * | 2/2020 | Gupta | ................ | G06Q 20/3272 |

(Continued)

FOREIGN PATENT DOCUMENTS

| | | |
|---|---|---|
| KR | 102443019 B1 | 9/2022 |
| WO | 2024073602 A1 | 4/2024 |

OTHER PUBLICATIONS

International Search Report and Written Opinion for corresponding International Application No. PCT/US2023/075423 mailed Jan. 22, 2024.

*Primary Examiner* — Steven S Kim
(74) *Attorney, Agent, or Firm* — K&L Gates LLP

(57) ABSTRACT

A method for personalizing a transaction via a blockchain network via payment network is disclosed herein. The method can include receiving an application programming interface ("API") call from a computing device of a user, wherein the API call includes a private key, a public key, and a unique identifier, detecting, a non-fungible token ("NFT") on the blockchain network based on the public key, authenticating the NFT asset on the blockchain network based on the private key, storing an NFT asset associated with the NFT, the private key, the public key, and the unique identifier upon authenticating the NFT, associating the unique identifier with the NFT upon authenticating the NFT, and transmitting the NFT asset to the computing device of the user, wherein the NFT asset is configured for use in association with a transaction associated with the unique identifier.

20 Claims, 10 Drawing Sheets

(56)           References Cited

U.S. PATENT DOCUMENTS

| | | | |
|---|---|---|---|
| 11,348,099 B2 | 5/2022 | Vijayan | |
| 12,137,168 B2 * | 11/2024 | Khan | H04L 9/3236 |
| 12,175,454 B1 * | 12/2024 | Kurani | G06Q 20/3827 |
| 2020/0219078 A1 | 7/2020 | Chen | |
| 2020/0402048 A1 | 12/2020 | Cluxton | |
| 2021/0390531 A1 | 12/2021 | Voorhees et al. | |
| 2022/0277398 A1 | 9/2022 | Grube | |
| 2022/0300954 A1 | 9/2022 | Paler | |
| 2022/0383303 A1 * | 12/2022 | Mullen | G06Q 20/389 |
| 2024/0104560 A1 * | 3/2024 | Ravinathan | G06Q 20/02 |
| 2024/0232858 A1 * | 7/2024 | Tax | H04L 9/50 |

* cited by examiner

300

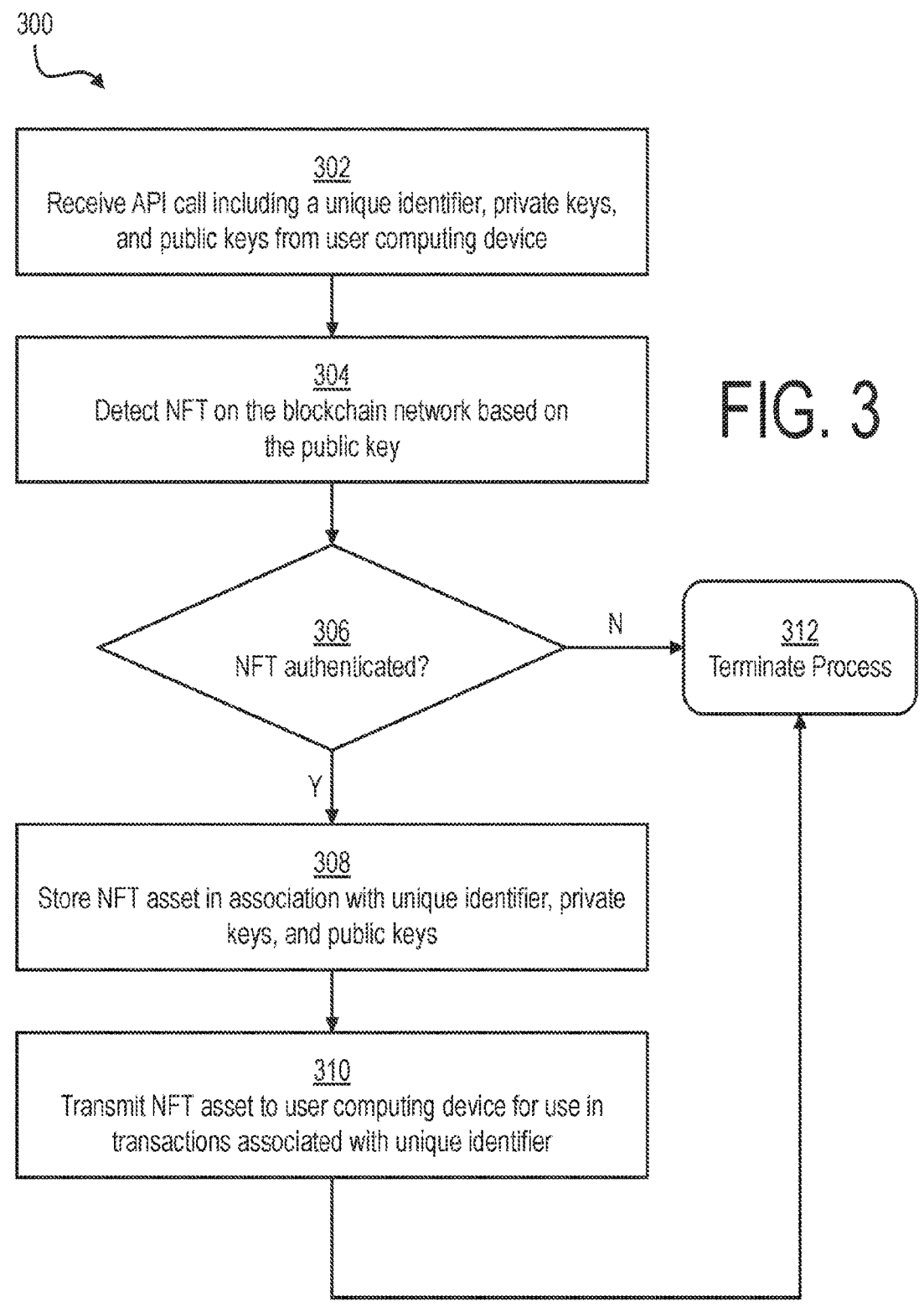

FIG. 3

302
Receive API call including a unique identifier, private keys, and public keys from user computing device

304
Detect NFT on the blockchain network based on the public key

306
NFT authenticated?

N

312
Terminate Process

Y

308
Store NFT asset in association with unique identifier, private keys, and public keys

310
Transmit NFT asset to user computing device for use in transactions associated with unique identifier

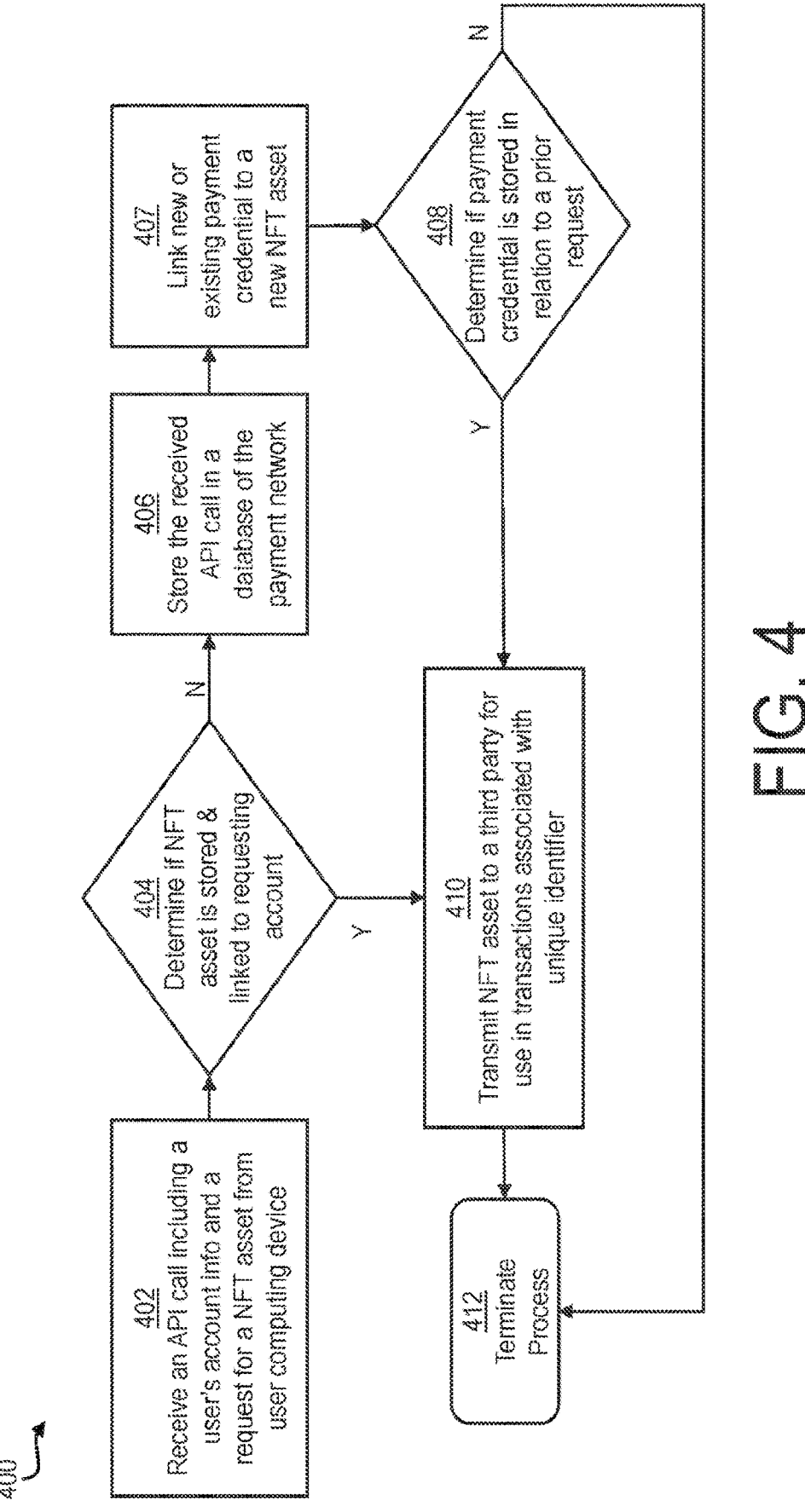

402
Receive an API call including a user's account info and a request for a NFT asset from user computing device

404
Determine if NFT asset is stored & linked to requesting account

406
Store the received API call in a database of the payment network

407
Link new or existing payment credential to a new NFT asset

408
Determine if payment credential is stored in relation to a prior request

410
Transmit NFT asset to a third party for use in transactions associated with unique identifier

412
Terminate Process

DEVICES, SYSTEMS, AND METHODS FOR ENHANCING TRANSACTIONS VIA A BLOCKCHAIN NETWORK

CROSS-REFERENCE TO RELATED APPLICATIONS

This application is a U.S. National Stage Entry under 35 U.S.C. § 371 of International Patent Application No. PCT/US2023/075423, filed Sep. 28, 2023, entitled DEVICES, SYSTEMS, AND METHODS FOR ENHANCING TRANSACTIONS VIA A BLOCKCHAIN NETWORK, which claims the benefit of and priority under 35 U.S.C. § 119(e) to U.S. Provisional Application No. 63/377,649, filed Sep. 29, 2022, entitled DEVICES, SYSTEMS, AND METHODS FOR ENHANCING TRANSACTIONS VIA A BLOCKCHAIN NETWORK, the contents of which is hereby incorporated by reference in its entirety herein.

TECHNICAL FIELD

The present disclosure is generally related to dynamic information storage and retrieval and, more particularly, is directed to the selection, storage, retrieval, and playback of multimedia objects associated with non-fungible tokens hosted on a blockchain network as part of a transaction authorization or digital storage of a unique identifier.

SUMMARY

The following summary is provided to facilitate an understanding of some of the innovative features unique to the aspects disclosed herein, and is not intended to be a full description. A full appreciation of the various aspects can be gained by taking the entire specification, claims, and abstract as a whole.

In various aspects, a method for personalizing a transaction or personalizing digital storage of a payment credential via a blockchain network via payment network is disclosed. The method can include receiving, via a payment network, an application programming interface ("API") call from a computing device of a user, wherein the API call includes a private key, a public key, and a unique identifier, detecting, via the payment network, a non-fungible token ("NFT") on the blockchain network based on the public key, authenticating, via the payment network, the NFT on the blockchain network based on the private key, storing, via the payment network, an NFT asset associated with the NFT, the private key, the public key, and the unique identifier, based on a successful authentication of the NFT, associating, via the payment network, the unique identifier with the NFT based on the successful authentication of the NFT, and transmitting, via the payment network, the NFT asset, wherein the NFT asset is configured for use in association with a transaction or digital storage associated with the unique identifier.

In various aspects, a payment network configured to personalize a transaction via a blockchain network is disclosed. The payment network can include a database, and a server including a processor and a memory configured to store an application program interface ("API") and instructions that, when executed by the processor, cause the payment network to receive an API call from a computing device of a user, wherein the API call includes a private key, a public key, and a unique identifier associated with a payment device of the user, detect a non-fungible token ("NFT") on the blockchain network based on the public key, authenticate the NFT on the blockchain network based on the private key, store an NFT asset associated with the NFT, the private key, the public key, and the unique identifier in the database based on a successful authentication of the NFT, associate the unique identifier with the NFT based on the successful authentication of the NFT, and transmit the NFT asset, wherein the NFT asset is configured for use in association with a transaction associated with the payment device or use in the digital storage of a unique identifier.

In various aspects, system for personalizing a transaction via a blockchain network is disclosed. The system can include a computing device of a user, and a payment network including a database, and a server including a processor and a memory configured to store an application program interface ("API") and instructions that, when executed by the processor, cause the payment network to receive an API call from a computing device of a user, wherein the API call includes a private key, a public key, and a unique identifier associated with a payment device of the user, detect a non-fungible token ("NFT") on the blockchain network based on the public key, authenticate the NFT on the blockchain network based on the private key, store an NFT asset associated with the NFT, the private key, the public key, and the unique identifier in the database based on a successful authentication of the NFT, associate the unique identifier with the NFT based on the successful authentication of the NFT, and transmit the NFT asset, wherein the NFT asset is configured for use in association with a transaction associated with the payment device or use in the digital storage of a unique identifier.

These and other and characteristics of the present disclosure, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the present disclosure.

BRIEF DESCRIPTION OF THE DRAWINGS

In the description, for purposes of explanation and not limitation, specific details are set forth, such as particular aspects, procedures, techniques, etc. to provide a thorough understanding of the present technology. However, it will be apparent to one skilled in the art that the present technology may be practiced in other aspects that depart from these specific details.

The accompanying drawings, where like reference characters refer to identical or functionally similar elements throughout the separate views, together with the detailed description below, are incorporated in and form part of the specification, and serve to further illustrate aspects of concepts that include the claimed disclosure and explain various principles and advantages of those aspects.

Figure 1:
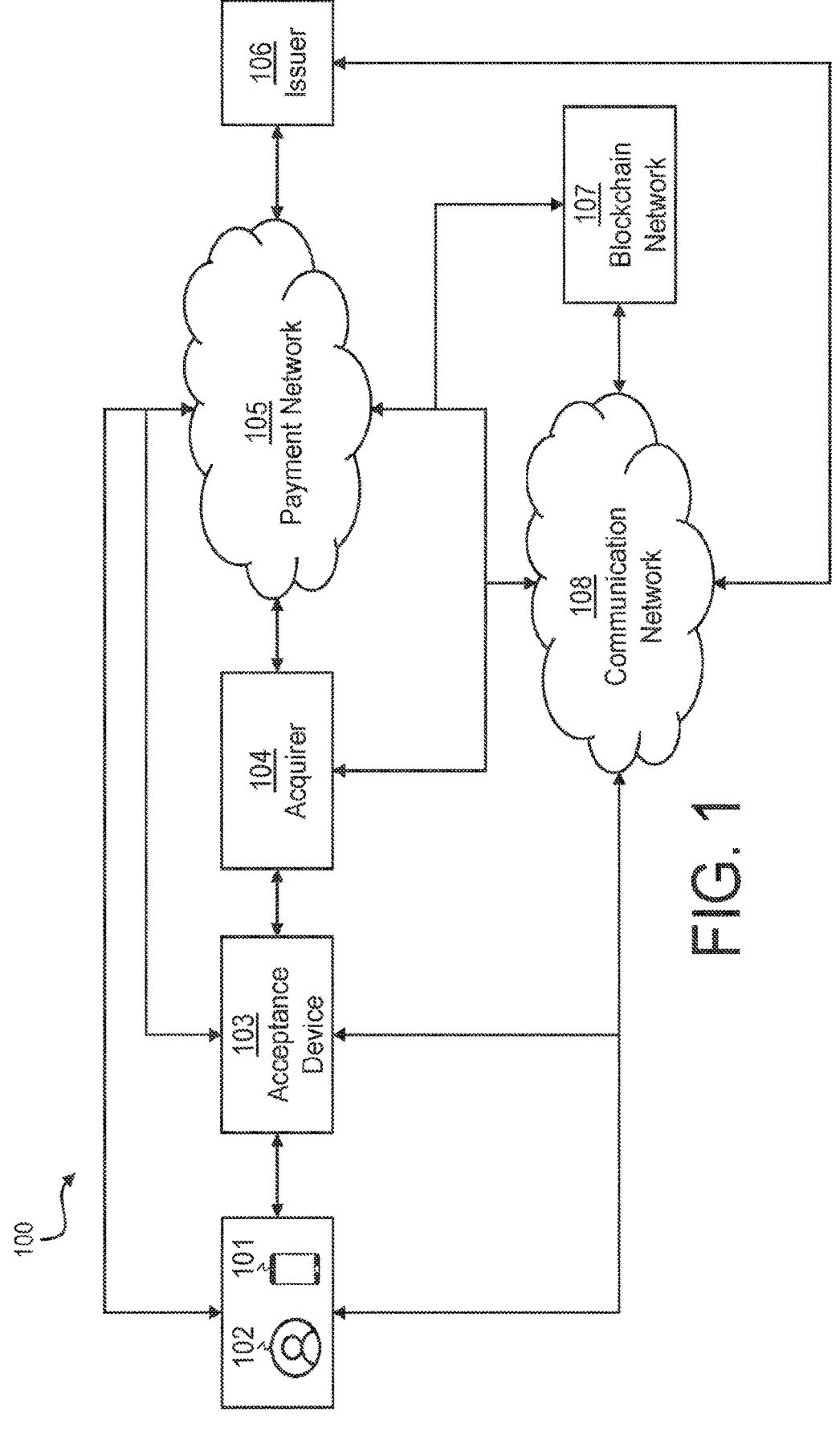

The methods and systems disclosed herein have been represented where appropriate by conventional symbols in the drawings, showing only those specific details that are pertinent to understanding the various aspects of the present disclosure so as not to obscure the disclosure with details that will be readily apparent to those of ordinary skill in the art having the benefit of the description herein.

FIG. 1 illustrates a block diagram of a payment system configured to enhance a transaction via a non-fungible token ("NFT") hosted on a blockchain network, in accordance with at least one non-limiting aspect of the present disclosure.

Figure 2:
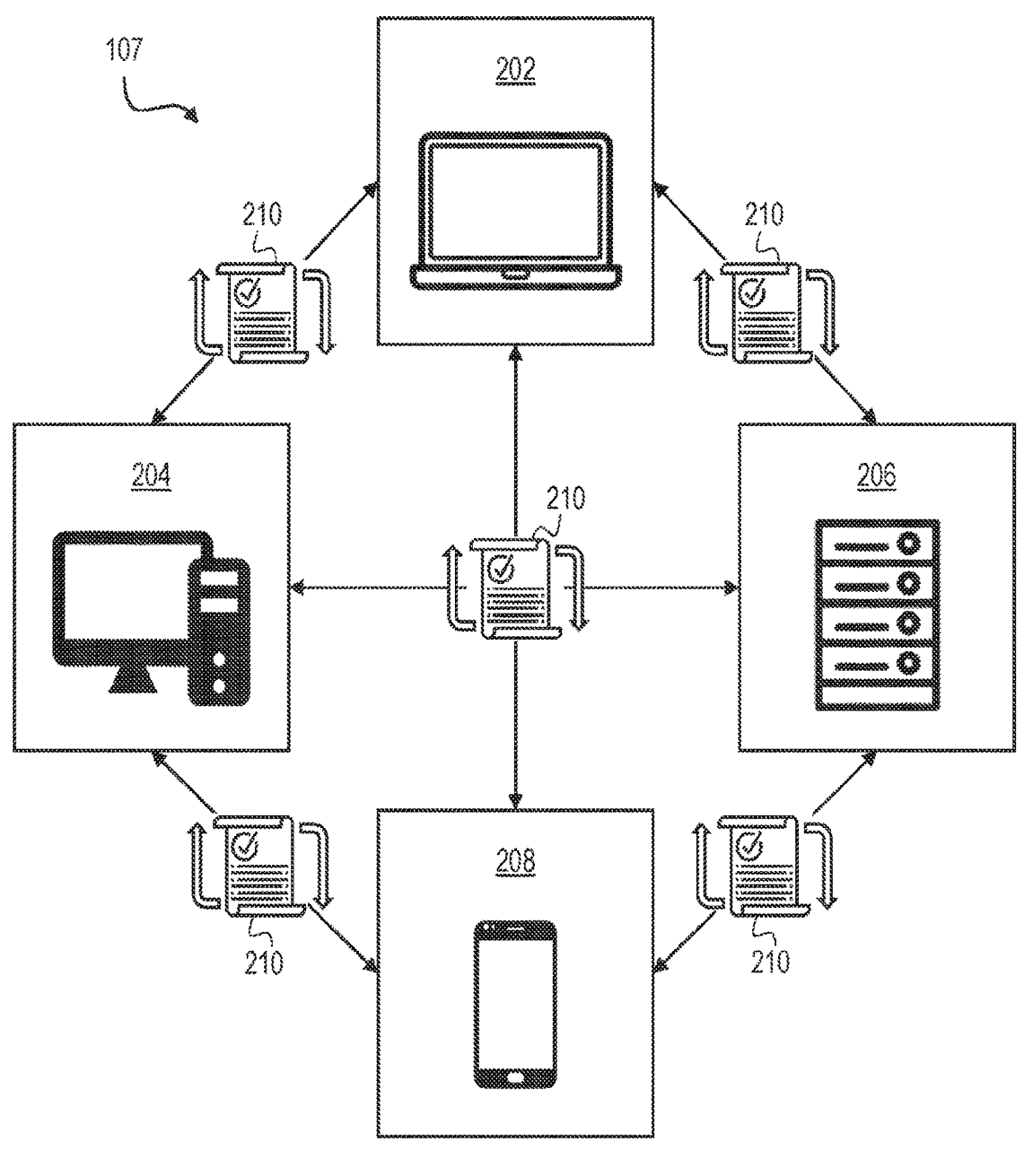

FIG. 2 illustrates a block diagram of a system for implementing a blockchain network configured to host an NFT, in accordance with at least one non-limiting aspect of the present disclosure.

FIG. 3 illustrates a logic flow diagram of a method of enhancing a transaction processed by the system of FIG. 1 via a NFT hosted on the blockchain network of FIG. 2, in accordance with at least one non-limiting aspect of the present disclosure.

FIG. 4 illustrates a logic flow diagram of another method of enhancing a transaction processed by the system of FIG. 1 via a NFT hosted on the blockchain network of FIG. 2, in accordance with at least one non-limiting aspect of the present disclosure.

Figure 5:
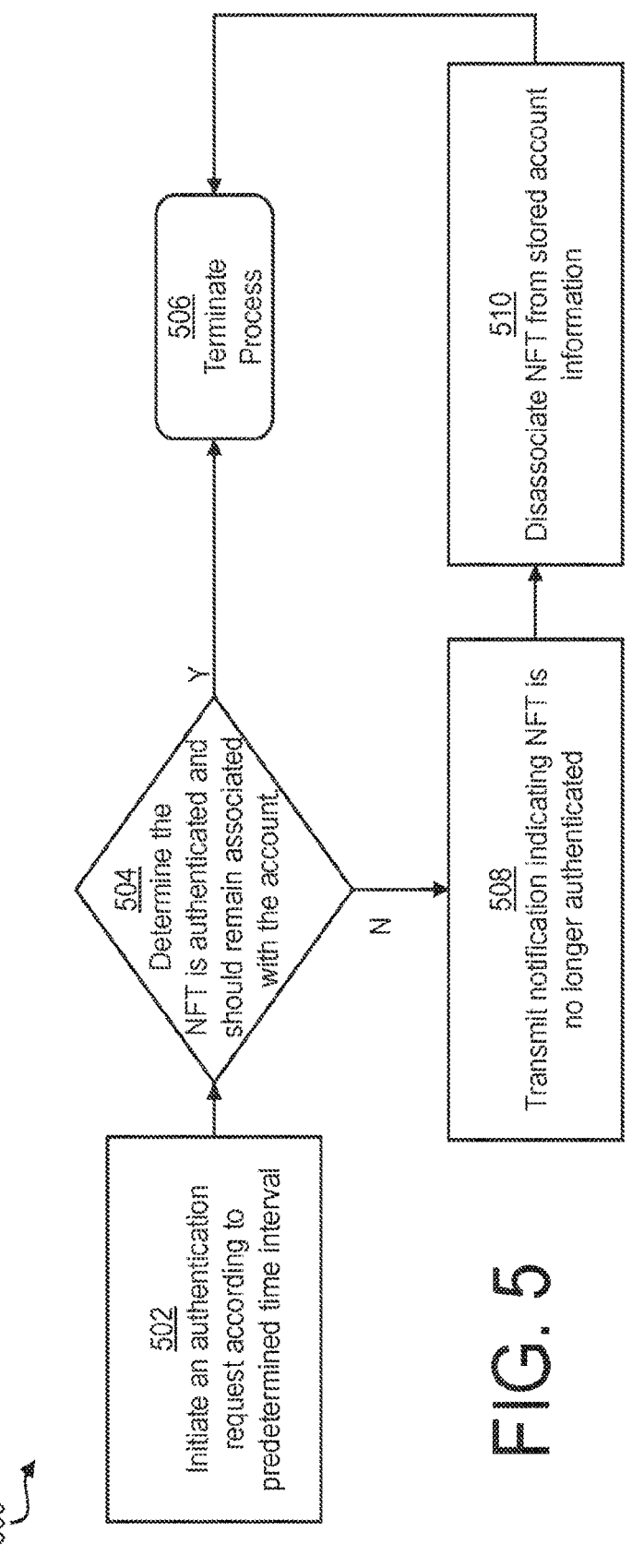

FIG. 5 illustrates a method of continuously authenticating a NFT hosted on the blockchain network of FIG. 2 for the continued enhancement of transactions, in accordance with at least one non-limiting aspect of the present disclosure.

Figure 6:
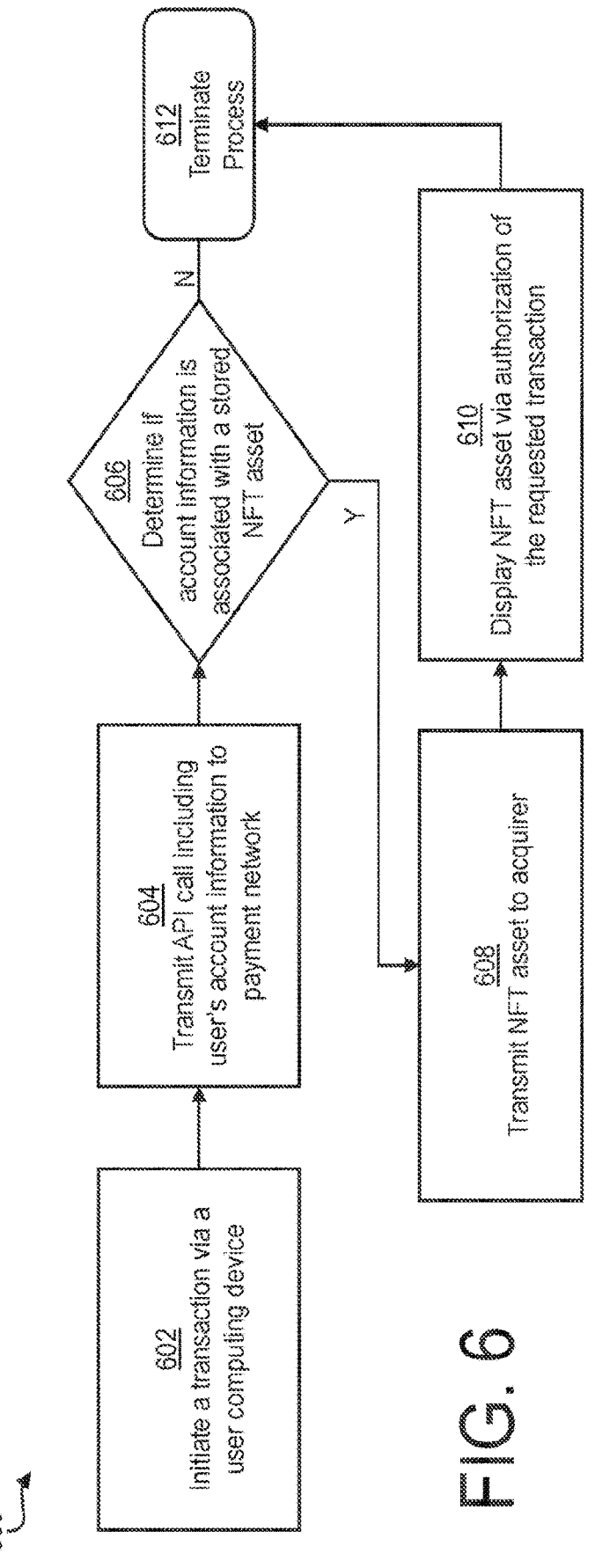

FIG. 6 illustrates a flow chart of another method of enhancing a transaction processed by the system of FIG. 1 via a NFT hosted on the blockchain network of FIG. 2, in accordance with at least one non-limiting aspect of the present disclosure.

Figure 7B:
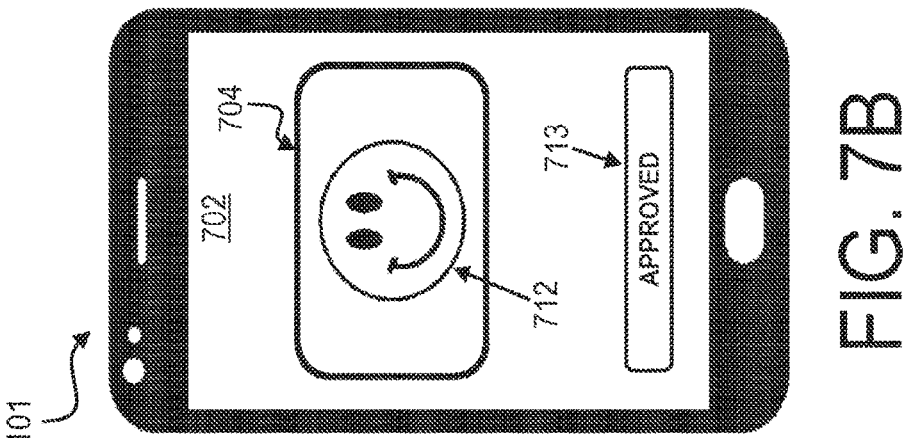
Figure 7A:
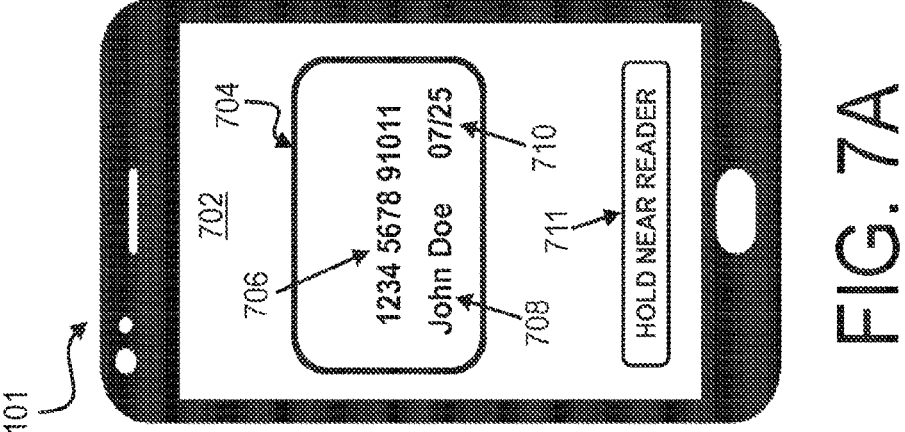

FIGS. 7A and 7B illustrate a block diagram of the presentation of a NFT asset on via a computing device 101 (FIG. 1) of the system of FIG. 1, in accordance with at least one non-limiting aspect of the present disclosure.

Figure 8B:
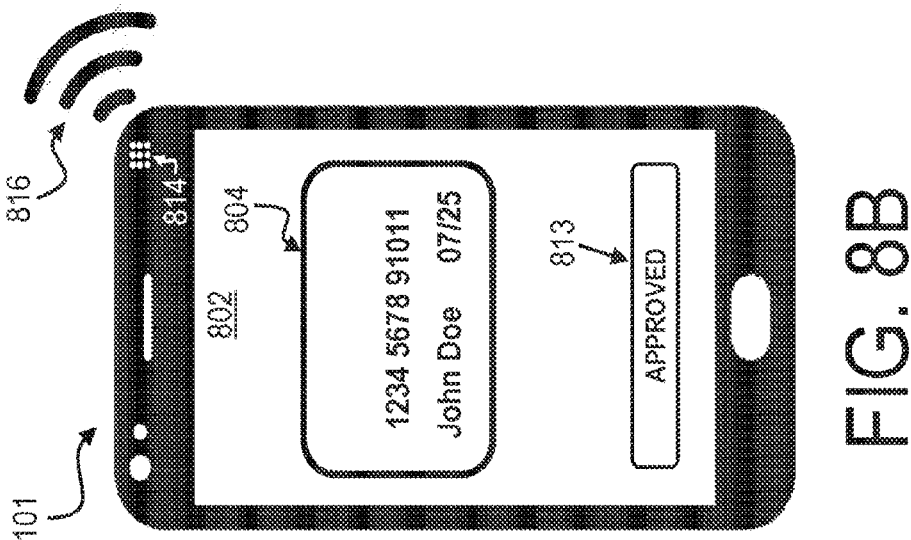
Figure 8A:
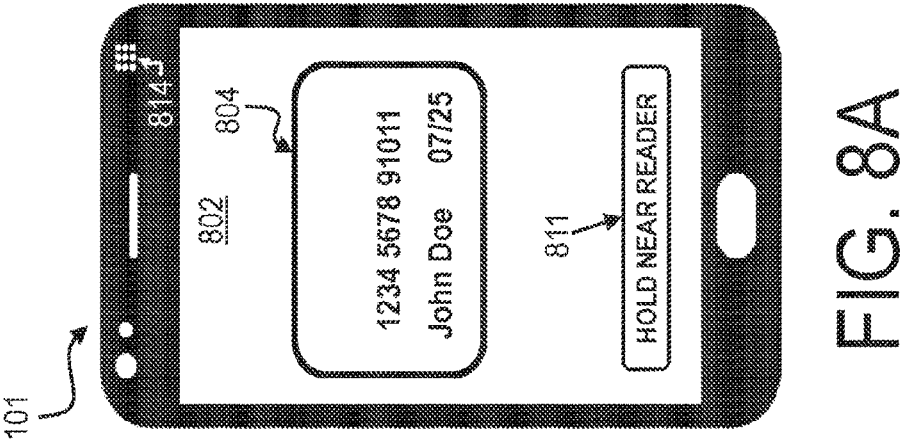

FIGS. 8A and 8B illustrate a block diagram of the presentation of a NFT asset on via a computing device 101 (FIG. 1) of the system of FIG. 1, in accordance with at least one non-limiting aspect of the present disclosure.

Figure 9:
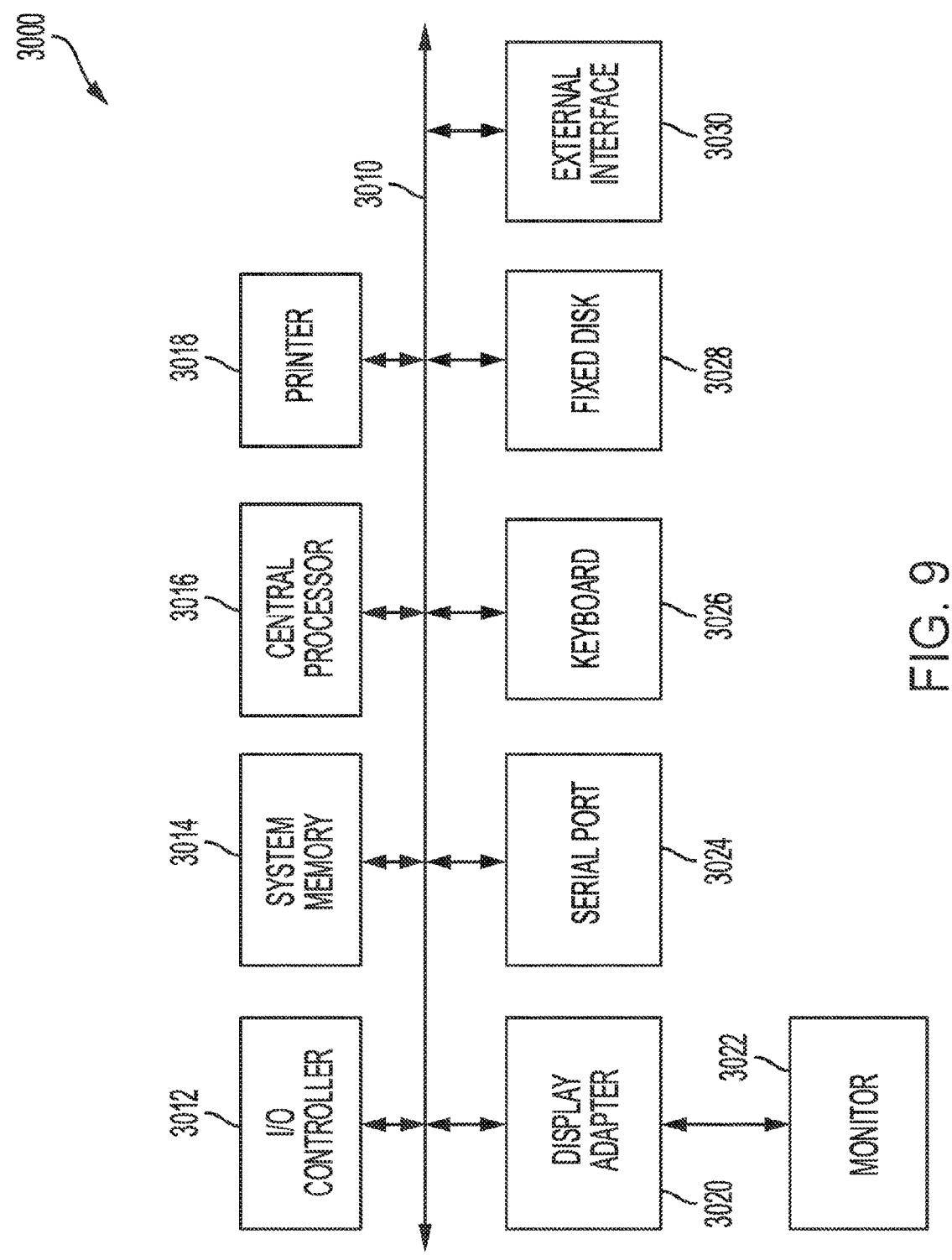

FIG. 9 illustrates a block diagram of a computer apparatus, according to at least aspect of the present disclosure.

Figure 10:
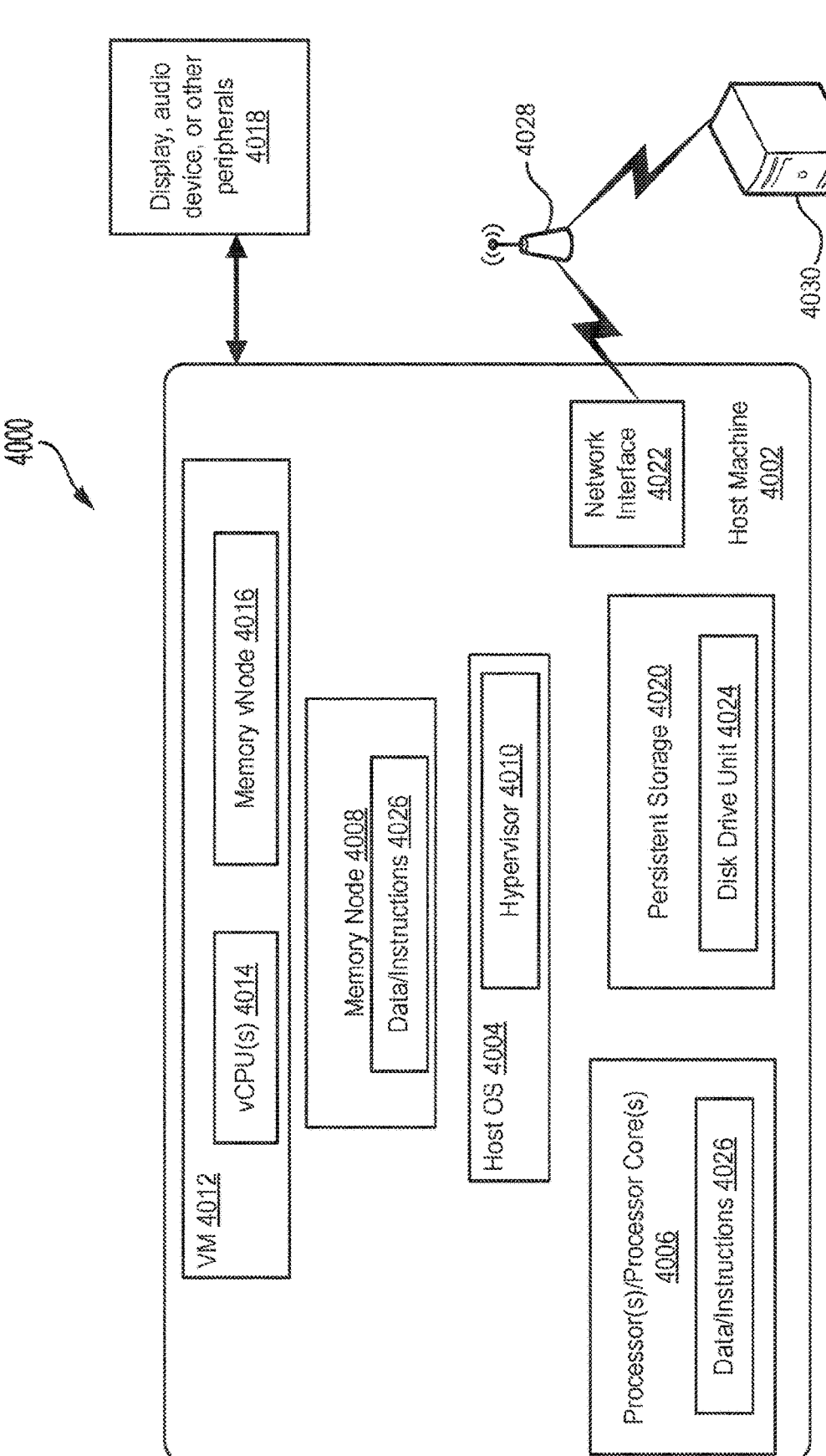

FIG. 10 illustrates a diagrammatic representation of an example system that includes a host machine within which a set of instructions to perform any one or more of the methodologies discussed herein may be executed, according to at least one aspect of the present disclosure.

DESCRIPTION

Numerous specific details are set forth to provide a thorough understanding of the overall structure, function, manufacture, and use of the aspects as described in the disclosure and illustrated in the accompanying drawings. Well-known operations, components, and elements have not been described in detail so as not to obscure the aspects described in the specification. The reader will understand that the aspects described and illustrated herein are non-limiting examples, and thus it can be appreciated that the specific structural and functional details disclosed herein may be representative and illustrative. Variations and changes thereto may be made without departing from the scope of the claims.

Before discussing specific aspects and examples, some descriptions of terms used herein are provided below.

A "consumer" may include an individual or a user that may be associated with one or more personal accounts and/or consumer devices. The consumer may also be referred to as a cardholder, account holder, or user.

A "primary account number (PAN)" may be a variable length, (e.g. 13 to 19-digit) industry standard-compliant account number that is generated within account ranges associated with a BIN by an issuer.

An "authorization request message" may be an electronic message that is sent to a payment processing network and/or an issuer of a payment account to request authorization for a payment transaction. An authorization request message according to some aspects may comply with International Organization for Standardisation (ISO) 8583, which is a standard for systems that exchange electronic transaction information associated with a payment made by a consumer using a payment device or a payment account. An ISO 8583 message includes a message type indicator, one or more bitmaps indicating which data elements are present in the message, and data elements of the message. The authorization request message may include an issuer account identifier that may be associated with a payment device or payment account. An authorization request message may be generated by an acceptance device or a server and may be sent to an issuing financial institution directly or through a payment network. In some aspects of the present disclosure, an authorization request message may include a payment token, an expiration date, a token presentment mode, a token requestor identifier, a token cryptogram, a token assurance level, and data used to generate the token assurance level. The payment token may include a payment token issuer identifier that may be a substitute for a real issuer identifier for an issuer. For example, the real issuer identifier may be part of a BIN range associated with the issuer. An authorization request message may also comprise additional data elements corresponding to "identification information" including, for example, a service code, a CVV or CVC (card verification value or code), a dCVV or dCVC (dynamic card verification value or code), token cryptogram, an expiration date, etc. An authorization request message may also comprise "transaction information," such as any information associated with a current transaction (e.g. the transaction amount, merchant identifier, merchant location, etc.) as well as any other information that may be utilized in determining whether to identify and/or authorize a payment transaction.

An "authorization request message" may be a message that includes a payment account identifier. The payment account identifier may be a portable consumer device account identifier associated with a portable consumer device. The authorization request message may request that an issuer of the portable consumer device authorize a transaction. The authorization request message may include an approval code indicating approval of an authorization request.

The authorization request message may have a defined format to allow requests and responses between points in a financial network. The data included in the authorization request message may include data obtained from a payment device as well as other data related to the transaction, the payment account holder, the merchant, and processing information, such as one or more of a payment account number, a payment device expiration date, a currency code, a transaction amount, a merchant transaction stamp, the acceptor city, the acceptor state/country, a routing transit number, a terminal identification, a network identification, etc. An authorization request message may be protected using a secure encryption method (e.g., 128-bit SSL or equivalent) in order to prevent data from being compromised.

An "authorization response message" may be an electronic message reply to an authorization request message generated by an issuing financial institution (e.g., issuer) or a payment processing network. The authorization response message may include, by way of example only, one or more of the following status indicators: Approval—transaction was approved; Decline—transaction was not approved; or Call Center—response pending more information, merchant must call the toll-free authorization phone number. The authorization response message may include an authorization code, which may be a code that an account issuing bank returns in response to an authorization request message in an electronic message (either directly or through the payment processing network) to the merchant's access device (e.g. POS terminal) that indicates approval of the transaction. The code may serve as proof of authorization. As noted above, in some aspects, a payment processing network may generate and/or forward the authorization response message to the merchant.

A "server computer" may typically be a powerful computer or cluster of computers. For example, the server computer can be a large mainframe, a minicomputer cluster, or a group of servers functioning as a unit. The server computer may be associated with an entity such as a payment processing network, a wallet provider, a merchant, an authentication cloud, an acquirer or an issuer. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers. In some aspects, the server computer may provide and/or support payment network cloud service.

The terms "issuer institution," "portable financial device issuer," "issuer," or "issuer bank" may refer to one or more entities that provide one or more accounts (e.g., a credit account, a debit account, a credit card account, a debit card account, and/or the like) to a user (e.g., customer, consumer, and/or the like) for conducting transactions (e.g., payment transactions), such as initiating credit and/or debit payments. For example, an issuer may provide an account identifier, such as a personal account number (PAN), to a user that uniquely identifies one or more accounts associated with the user. The account identifier may be used by the user to conduct a payment transaction. The account identifier may be embodied on a portable financial device, such as a physical financial instrument, e.g., a payment card, and/or may be electronic and used for electronic payments. In some non-limiting aspects, an issuer may be associated with a bank identification number (BIN) that uniquely identifies the issuer. As used herein "issuer system" or "issuer institution system" may refer to one or more systems operated by or operated on behalf of an issuer. For example, an issuer system may refer to a server executing one or more software applications associated with the issuer. In some non-limiting aspects, an issuer system may include one or more servers (e.g., one or more authorization servers) for authorizing a payment transaction.

An "issuer" can include a payment account issuer. The payment account (which may be associated with one or more payment devices) may refer to any suitable payment account (e.g. credit card account, a checking account, a savings account, a merchant account assigned to a consumer, or a prepaid account), an employment account, an identification account, an enrollment account (e.g. a student account), etc.

A "payment network" may refer to an electronic payment system used to accept, transmit, or process transactions made by payment devices for money, goods, or services. The payment network may transfer information and funds among issuers, acquirers, merchants, and payment device users. One illustrative non-limiting example of a payment network is VisaNet, which is operated by Visa, Inc.

A "payment processing network" may refer to a system that receives accumulated transaction information from the gateway processing service, typically at a fixed time each day, and performs a settlement process. Settlement may involve posting the transactions to the accounts associated with the payment devices used for the transactions and calculating the net debit or credit position of each user of the payment devices. An exemplary payment processing network is Interlink®.

A "transaction amount" may be the price assessed to the consumer for the transaction. The transaction amount condition may be a threshold value (e.g., all transactions for an amount exceeding $100) or a range (e.g., all transactions in the range of $25-$50). For example, a user may wish to use a first routing priority list for a transaction for an amount in the range of $0.01-$100 and a second routing priority list for a transaction for an amount exceeding $100.

A "key" may refer to a piece of information that is used in a cryptographic algorithm to transform input data into another representation. An exemplary encryption key may include a master derivation key (MDK) which may be used to generate a limited use key (LUK) that is provided to a computer device of a user. An LUK can be an encryption key that is intended for limited use (e.g., a limited number of transactions or a limited time period) and is not intended to be used for the lifetime of an account. Further details regarding LUKs can be found in U.S. Published Patent Application No. 2015/0180836, which is herein incorporated by reference in its entirety and is assigned to the same assignee as the present application. The MDK may be used to generate and provision the token, as well as, authenticate the token when used in authorization processing by validating static and variable transaction data.

A "cryptographic algorithm" can be an encryption algorithm that transforms original data into an alternate representation, or a decryption algorithm that transforms encrypted information back to the original data. Examples of cryptographic algorithms may include triple data encryption standard (TDES), data encryption standard (DES), advanced encryption standard (AES), etc. Encryption techniques may include symmetric and asymmetric encryption techniques.

A "user device" is an electronic device that may be transported and/or operated by a user. A user device may provide remote communication capabilities to a network. The user device may be configured to transmit and receive data or communications to and from other devices. In some aspects, the user device may be portable. Examples of user devices may include mobile phones (e.g., smart phones, cellular phones, etc.), PDAs, portable media players, wearable electronic devices (e.g. smart watches, fitness bands, ankle bracelets, rings, earrings, etc.), electronic reader devices, and portable computing devices (e.g., laptops, netbooks, ultrabooks, etc.). Examples of user devices may also include automobiles with remote communication capabilities.

An "application" may include any software module configured to perform a specific function or functions when executed by a processor of a computer. For example, a "mobile application" may include a software module that is configured to be operated by a mobile device. Applications may be configured to perform many different functions. For instance, a "payment application" may include a software module that is configured to store and provide account credentials for a transaction. A "wallet application" may include a software module with similar functionality to a payment application that has multiple accounts provisioned or enrolled such that they are usable through the wallet application. An "application" may be computer code or other data stored on a computer readable medium (e.g. memory element or secure element) that may be executable by a processor to complete a task.

"Authentication" is a process by which the credential of an endpoint (including but not limited to applications, people, devices, process, and systems) can be verified to ensure that the endpoint is who they are declared to be.

As used herein, the term "merchant" may refer to one or more individuals or entities (e.g., operators of retail businesses that provide goods and/or services, and/or access to goods and/or services, to a user (e.g., a customer, a consumer, a customer of the merchant, and/or the like) based on a transaction (e.g., a payment transaction)). As used herein "merchant system" may refer to one or more computer systems operated by or on behalf of a merchant, such as a server computer executing one or more software applications.

As used herein, the term "communication" and "communicate" may refer to the reception, receipt, transmission, transfer, provision, and/or the like of information (e.g., data, signals, messages, instructions, calls, commands, and/or the like). A communication may use a direct or indirect connection and may be wired and/or wireless in nature. As an example, for one unit (e.g., a device, a system, a component of a device or system, combinations thereof, and/or the like) to communicate with another unit means that the one unit is able to directly or indirectly receive information from and/or transmit information to the other unit. The one unit may communicate with the other unit even though the information may be modified, processed, relayed, and/or routed between the one unit and the other unit. In one example, a first unit may communicate with a second unit even though the first unit receives information and does not communicate information to the second unit. For example, a first unit may be in communication with a second unit even though the first unit passively receives data and does not actively transmit data to the second unit. As another example, a first unit may communicate with a second unit if an intermediary unit (e.g., a third unit located between the first unit and the second unit) receives information from the first unit, processes the information received from the first unit to produce processed information, and communicates the processed information to the second unit. In some non-limiting aspects, a message may refer to a packet (e.g., a data packet, a network packet, and/or the like) that includes data. It will be appreciated that numerous other arrangements are possible.

As used herein, the term "computing device" or "computer device" may refer to one or more electronic devices that are configured to directly or indirectly communicate with or over one or more networks. A computing device may be a mobile device, a desktop computer, and/or the like. As an example, a mobile device may include a cellular phone (e.g., a smartphone or standard cellular phone), a portable computer, a wearable device (e.g., watches, glasses, lenses, clothing, and/or the like), a personal digital assistant (PDA), and/or other like devices. The computing device may not be a mobile device, such as a desktop computer. Furthermore, the term "computer" may refer to any computing device that includes the necessary components to send, receive, process, and/or output data, and normally includes a display device, a processor, a memory, an input device, a network interface, and/or the like.

As used herein, the term "server" may include one or more computing devices which can be individual, stand-alone machines located at the same or different locations, may be owned or operated by the same or different entities, and may further be one or more clusters of distributed computers or "virtual" machines housed within a datacenter. It should be understood and appreciated by a person of skill in the art that functions performed by one "server" can be spread across multiple disparate computing devices for various reasons. As used herein, a "server" is intended to refer to all such scenarios and should not be construed or limited to one specific configuration. Further, a server as described herein may, but need not, reside at (or be operated by) a merchant, a payment network, a financial institution, a healthcare provider, a social media provider, a government agency, or agents of any of the aforementioned entities. The term "server" may also refer to or include one or more processors or computers, storage devices, or similar computer arrangements that are operated by or facilitate communication and processing for multiple parties in a network environment, such as the Internet, although it will be appreciated that communication may be facilitated over one or more public or private network environments and that various other arrangements are possible. Further, multiple computers, e.g., servers, or other computerized devices, e.g., point-of-sale devices, directly or indirectly communicating in the network environment may constitute a "system," such as a merchant's point-of-sale system. Reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

As used herein, the term "system" may refer to one or more computing devices or combinations of computing devices (e.g., processors, servers, client devices, software applications, components of such, and/or the like).

As used herein, a "mobile device" may comprise any electronic device that may be transported and operated by a user, which may also provide remote communication capabilities to a network. Examples of remote communication capabilities include using a mobile phone (wireless) network, wireless data network (e.g. 3G, 4G or similar networks), Wi-Fi, Wi-Max, or any other communication medium that may provide access to a network such as the Internet or a private network. Examples of mobile devices include mobile phones (e.g. cellular phones), PDAs, tablet computers, net books, laptop computers, personal music players, hand-held specialized readers, etc. Further examples of mobile devices include wearable devices, such as smart watches, fitness bands, ankle bracelets, rings, earrings, etc., as well as automobiles with remote communication capabilities. A mobile device may comprise any suitable hardware and software for performing such functions, and may also include multiple devices or components (e.g. when a device has remote access to a network by tethering to another device—e.g., using the other device as a modem—both devices taken together may be considered a single mobile device). A mobile device may also comprise a verification token in the form of, for instance, a secured hardware or software component within the mobile device and/or one or more external components that may be coupled to the mobile device. A detailed description of an exemplary mobile device is provided below.

The terms "client device" and "user device" refer to any electronic device that is configured to communicate with one or more servers or remote devices and/or systems. A client device or a user device may include a mobile device, a network-enabled appliance (e.g., a network-enabled television, refrigerator, thermostat, and/or the like), a computer, a POS system, and/or any other device or system capable of communicating with a network. A client device may further include a desktop computer, laptop computer, mobile computer (e.g., smartphone), a wearable computer (e.g., a watch, pair of glasses, lens, clothing, and/or the like), a cellular phone, a network-enabled appliance (e.g., a network-enabled television, refrigerator, thermostat, and/or the like), a point of sale (POS) system, and/or any other device, system, and/or software application configured to communicate with a remote device or system.

As used herein, the terms "client" and "client device" may refer to one or more client-side devices or systems (e.g., remote from a transaction service provider) used to initiate or facilitate a transaction (e.g., a payment transaction). As an example, a "client device" may refer to one or more POS devices used by a merchant, one or more acquirer host computers used by an acquirer, one or more mobile devices used by a user, and/or the like. In some non-limiting aspects, a client device may be an electronic device configured to communicate with one or more networks and initiate or facilitate transactions. For example, a client device may include one or more computers, portable computers, laptop computers, tablet computers, mobile devices, cellular phones, wearable devices (e.g., watches, glasses, lenses, clothing, and/or the like), PDAs, and/or the like. Moreover, a "client" may also refer to an entity (e.g., a merchant, an acquirer, and/or the like) that owns, utilizes, and/or operates a client device for initiating transactions (e.g., for initiating transactions with a transaction service provider).

An "interface" may include any software module configured to process communications. For example, an interface may be configured to receive, process, and respond to a particular entity in a particular communication format. Further, a computer, device, and/or system may include any number of interfaces depending on the functionality and capabilities of the computer, device, and/or system. In some aspects, an interface may include an application programming interface (API) or other communication format or protocol that may be provided to third parties or to a particular entity to allow for communication with a device. Additionally, an interface may be designed based on functionality, a designated entity configured to communicate with, or any other variable. For example, an interface may be configured to allow for a system to field a particular request or may be configured to allow a particular entity to communicate with the system.

An "application" or "application program interface" (API) refers to computer code or other data sorted on a computer-readable medium that may be executed by a processor to facilitate the interaction between software components, such as a client-side front-end and/or server-side back-end for receiving data from the client. An "interface" refers to a generated display, such as one or more graphical user interfaces (GUIs) with which a user may interact, either directly or indirectly (e.g., through a keyboard, mouse, touchscreen, etc.).

A "credential" may be any suitable information that serves as reliable evidence of worth, ownership, identity, or authority. A credential may be a string of numbers, letters, or any other suitable characters that may be present or contained in any object or document that can serve as confirmation. Examples of credentials include value credentials, identification cards, certified documents, access cards, passcodes, payment account details and other login information, etc.

"Payment credentials" may include any suitable information associated with an account (e.g. a payment account and/or payment device associated with the account). Such information may be directly related to the account or may be derived from information related to the account. Examples of account information may include a PAN (primary account number or "account number"), user name, expiration date, CVV (card verification value), dCVV (dynamic card verification value), CVV2 (card verification value 2), CVC3 card verification values, etc. CVV2 is generally understood to be a static verification value associated with a payment device. CVV2 values are generally visible to a user (e.g., a consumer), whereas CVV and dCVV values are typically embedded in memory or authorization request messages and are not readily known to the user (although they are known to the issuer and payment processors). Payment credentials may be any information that identifies or is associated with a payment account. Payment credentials may be provided in order to make a payment from a payment account. Payment credentials can also include a user name, an expiration date, a gift card number or code, and any other suitable information.

As used herein, the term "multimedia object" may refer to a digital file containing multimedia content including audio, images, animations, video, vibration patterns, and interactive content. Multimedia objects may be represented in various formats and computer file types or may be represented by a pointer, network address, or uniform resource indicator (URI) denoting a location at which a multimedia file may be located and/or retrieved. Multimedia objects may be output by a computing device with suitable output capability and may be observable by a device user or other entity.

As used herein, the term "comprising" is not intended to be limiting, but may be a transitional term synonymous with "including," "containing," or "characterized by." The term "comprising" may thereby be inclusive or open-ended and does not exclude additional, unrecited elements or method steps when used in a claim. For instance, in describing a method, "comprising" indicates that the claim is open-ended and allows for additional steps. In describing a device, "comprising" may mean that a named element(s) may be essential for an aspect of the present disclosure, but other elements may be added and still form a construct within the scope of a claim. In contrast, the transitional phrase "consisting of" excludes any element, step, or ingredient not specified in a claim. This is consistent with the use of the term throughout the specification.

As used herein, an "electronic wallet" or "digital wallet" or "mobile wallet" can store user profile information, payment information (including tokens), bank account information, and/or the like and can be used in a variety of transactions, such as but not limited to eCommerce, social networks, money transfer/personal payments, mobile commerce, proximity payments, gaming, and/or the like for retail purchases, digital goods purchases, utility payments, purchasing games or gaming credits from gaming websites, transferring funds between users, and/or the like. A "digital wallet" can include an electronic device that allows an individual to conduct electronic commerce transactions. A digital wallet may be designed to streamline the purchase and payment process. A digital wallet may allow the user to load one or more payment cards onto the digital wallet so as to make a payment without having to enter an account number or present a physical card.

As used herein, the terms "electronic wallet," "electronic wallet mobile application," and "digital wallet" may refer to one or more electronic devices and/or one or more software applications configured to initiate and/or conduct transactions (e.g., payment transactions, electronic payment transactions, and/or the like). For example, an electronic wallet may include a user device (e.g., a mobile device) executing an application program and server-side software and/or databases for maintaining and providing transaction data to the user device. An "electronic wallet mobile application," and "digital wallet" may refer to one or more electronic devices and/or one or more software applications configured to store, display, or process a credential or payment credentials.

As used herein, "identification information" may include any suitable information associated with an account (e.g. a payment account and/or payment device associated with the account). Such information may be directly related to the account or may be derived from information related to the account. Examples of account information may include a PAN (primary account number or "account number"), user name, expiration date, CVV (card verification value), dCVV (dynamic card verification value), CVV2 (card verification value 2), CVC3 card verification values, etc. CVV2 is generally understood to be a static verification value associated with a payment device. CVV2 values are generally visible to a user (e.g., a consumer), whereas CVV and dCVV values are typically embedded in memory or authorization request messages and are not readily known to the user (although they are known to the issuer and payment processors).

The term "transaction data" may include any data associated with one or more transactions. In some aspects, the transaction data may merely include an account identifier (e.g., a PAN) or payment token. Alternatively, in other aspects, the transaction data may include any information generated, stored, or associated with a merchant, consumer, account, or any other related information to a transaction. For example, transaction data may include data in an authorization request message that is generated in response to a payment transaction being initiated by a consumer with a merchant. Alternatively, transaction data may include information associated with one or more transactions that have been previously processed and the transaction information has been stored on a merchant database or other merchant computer. The transaction data may include an account identifier associated with the payment instrument used to initiate the transaction, consumer personal information, products or services purchased, or any other information that may be relevant or suitable for transaction processing. Additionally, the transaction information may include a payment token or other tokenized or masked account identifier substitute that may be used to complete a transaction and protect the underlying account information of the consumer.

A "user" may include an individual. In some aspects, a user may be associated with one or more personal accounts and/or mobile devices. The user may also be referred to as a cardholder, account holder, or consumer.

An "acquirer" may refer to an entity licensed by the transaction service provider and/or approved by the transaction service provider to originate transactions (e.g., payment transactions) using a portable financial device associated with the transaction service provider. Acquirer may also refer to one or more computer systems operated by or on behalf of an acquirer, such as a server computer executing one or more software applications (e.g., "acquirer server"). An "acquirer" may be a merchant bank, or in some cases, the merchant system may be the acquirer. The transactions may include original credit transactions (OCTs) and account funding transactions (AFTs). The acquirer may be authorized by the transaction service provider to sign merchants of service providers to originate transactions using a portable financial device of the transaction service provider. The acquirer may contract with payment facilitators to enable the facilitators to sponsor merchants. The acquirer may monitor compliance of the payment facilitators in accordance with regulations of the transaction service provider. The acquirer may conduct due diligence of payment facilitators and ensure that proper due diligence occurs before signing a sponsored merchant. Acquirers may be liable for all transaction service provider programs that they operate or sponsor. Acquirers may be responsible for the acts of its payment facilitators and the merchants it or its payment facilitators sponsor.

The term "acquirer" typically be a business entity (e.g., a commercial bank) that has a business relationship with a particular merchant or other entity. Some entities can perform both issuer and acquirer functions. Some aspects may encompass such single entity issuer-acquirers. An acquirer may operate an acquirer computer, which can also be generically referred to as a "transport computer".

As used herein, the term "acquirer system" may also refer to one or more computer systems, computer devices, and/or the like operated by or on behalf of an acquirer. The transactions the acquirer may originate may include payment transactions (e.g., purchases, original credit transactions (OCTs), account funding transactions (AFTs), and/or the like). In some non-limiting aspects, the acquirer may originate non-payment related API calls, or functions such as to NTF assets or the like. In some non-limiting aspects, the acquirer may be authorized by the transaction service provider to assign merchant or service providers to originate transactions using a portable financial device of the transaction service provider. The acquirer may contract with payment facilitators to enable the payment facilitators to sponsor merchants. The acquirer may monitor compliance of the payment facilitators in accordance with regulations of the transaction service provider. The acquirer may conduct due diligence of the payment facilitators and ensure proper due diligence occurs before signing a sponsored merchant. The acquirer may be liable for all transaction service provider programs that the acquirer operates or sponsors. The acquirer may be responsible for the acts of the acquirer's payment facilitators, merchants that are sponsored by an acquirer's payment facilitator, and/or the like. In some non-limiting aspects, an acquirer may be a financial institution, such as a bank.

Reference to "a device," "a server," "a processor," and/or the like, as used herein, may refer to a previously-recited device, server, or processor that is recited as performing a previous step or function, a different server or processor, and/or a combination of servers and/or processors. For example, as used in the specification and the claims, a first server or a first processor that is recited as performing a first step or a first function may refer to the same or different server or the same or different processor recited as performing a second step or a second function.

As used in any aspect herein, the term "control circuit" may refer to, for example, hardwired circuitry, programmable circuitry (e.g., a computer processor including one or more individual instruction processing cores, processing unit, processor, microcontroller, microcontroller unit, controller, digital signal processor ("DSP"), programmable logic device ("PLD"), programmable logic array ("PLA"), or field programmable gate array ("FPGA"), state machine circuitry, firmware that stores instructions executed by programmable circuitry, and any combination thereof. The control circuit may, collectively or individually, be embodied as circuitry that forms part of a larger system, for example, an integrated circuit ("IC"), an application-specific integrated circuit ("ASIC"), a system on-chip ("SoC"), desktop computers, laptop computers, tablet computers, servers, smart phones, etc. Accordingly, as used herein "control circuit" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof. Additionally, it shall be appreciated that, as referenced herein, any specific type of control circuit can be effectively interchanged with any of the control circuits described above.

Before explaining various aspects of the articulated manipulator in detail, it should be noted that the illustrative examples are not limited in application or use to the details of construction and arrangement of parts illustrated in the accompanying drawings and description. The illustrative examples may be implemented or incorporated in other aspects, variations, and modifications, and may be practiced or carried out in various ways. Further, unless otherwise indicated, the terms and expressions employed herein have been chosen for the purpose of describing the illustrative examples for the convenience of the reader and are not for the purpose of limitation thereof. Also, it will be appreciated that one or more of the following-described aspects, expressions of aspects, and/or examples, can be combined with any one or more of the other following-described aspects, expressions of aspects, and/or examples.

Conventional payment systems generally utilize user account information, such as a payment credential, to authorize user transactions in a number of ways. For example, payment credentials can be transmitted to a merchant device (e.g., point-of-sale terminal, etc.) by swiping, inserting, or tapping a payment card (e.g., credit cards, debit cards, loyalty cards, gift cards, etc.). Additionally and/or alternately, conventional payment systems can utilize mobile computing devices—such as smartphones, smartwatches, mobile computers, and/or tablets, amongst other devices configured to access account information and transmit payment credentials to merchant devices—which are becoming increasingly prevalent in lieu of more conventional payment cards. Regardless of whether a payment card or mobile computing device is implemented, conventional payment systems generally do not allow for customizable transaction authorizations.

For example, conventional payment systems generally limit the user to issuer-generated authorization responses. It is common for an issuer to enable the merchant device to display a textual message, such as "approved." Conventional payment systems, at best, may enable a mobile computing device of the user to display a virtual representation of a payment card associated with the utilized payment credential. However, the aesthetics of the payment card are predetermined by the issuer and generally cannot be customized by the user. It would be beneficial if a multimedia object (e.g., an image file, a video file, an audio file, etc.) could be displayed and/or played by the merchant device and/or the mobile computing device—particularly if the payment system could confirm the exclusive ownership of such multimedia objects by the user. For example, if a payment system could interface with a blockchain and confirm user ownership of multimedia objects via non-fungible tokens ("NFTs"), the payment system could exclusively, within the payment system, permit the use of that multimedia object to personalize transaction authorizations of the confirmed user. As such, the payment system could not only enable the customization of a transaction authorization, but could expand the number of real-world applications for NFTs, and enhance transaction security. Accordingly, there is a need for devices, systems, and methods for enhancing a transaction via a non-fungible token hosted on a blockchain.

Referring now to FIG. 1, a block diagram of a payment system 100 configured to enhance a transaction via an NFT hosted on a blockchain is depicted in accordance with at least one non-limiting aspect of the present disclosure. According to the non-limiting aspect of FIG. 1, the system 100 can include a merchant device 103, an acquirer 104, a payment network 105, and an issuer 106, all of which may be servers operated by one or more entities. It should be appreciated by a person of skill in the art that there are many possible configurations for the systems configured to achieve a similar result as the system 100 of FIG. 1 and thus, the present disclosure contemplates other systems that include fewer or more entities, each of which may perform some or all of the tasks of the others, and may be owned or operated by various entities, including merchants, payment networks, and financial institutions. As such, the system 100 of FIG. 1 is merely illustrative. Likewise, communications between various components of the system 100 of FIG. 1 are shown as bi-directional, meaning information can be exchanged to and from each component.

According to the non-limiting aspect of FIG. 1, the system 100 can enable a user 102 to communicate with a merchant device 103 and attempt to perform a transaction using a mobile computing device 101, which may be a smartphone, portable computer, smart-watch or other wearable, and/or any other device configured to access account information (e.g., payment credentials, etc.) and initiate a transaction by providing payment credentials to the merchant device 103. The computing device 101 can include a speaker, a display screen, and/or any other output mechanism configured to output a multimedia asset. However, according to other non-limiting aspects, a payment card associated with payment credentials of the user 102 can be used in lieu of the computing device 101 and the merchant device 103 can include a speaker, a display screen, and/or any other output mechanism configured to output a multimedia asset.

As depicted in FIG. 1, the computing device 101 can be communicably coupled to the acceptance device 103, which also may be referred to herein as a merchant device 103 in some contexts. For example, according to some non-limiting aspects, the computing device 101 can initiate the transmission of payment credentials to the merchant device 103. For example, the computing device 101 can wirelessly transmit credentials to the merchant device 103 via Bluetooth®, radio field identification ("RFID"), and/or via a near-field communication ("NFC") protocol. Alternately and/or additionally, the merchant device 103 can be configured to receive payment credentials from the computing device 101 or a payment card via physical contact. For example, according to other non-limiting aspects, the merchant device 103 can be configured to receive payment credentials from a magnetic strip and/or RFID chip on the payment card when the payment card is inserted into, tapped upon, or slid through a particular feature of the merchant device 103. Regardless, the merchant device 103 can be configured to interact with (e.g., scan, interrogate, read, etc.) the computing device 101 and/or a payment card, for example, a mobile computing device.

Still referring to the non-limiting aspect of FIG. 1, when the user 102 initiates a transaction via the computing device 101 (or alternately, via a payment card), including the transmission of payment credentials, the merchant device 103 can generate a transaction authorization request and transmit the transaction authorization request to a server operated by an acquirer 104. According to the non-limiting aspect of FIG. 1, the acquirer 104 can include a financial institution at which a merchant operating the merchant device 103 maintains an account. The acquirer 104 can route the transaction authorization request message to a payment network 105, depending on the payment credentials and/or data corresponding to a merchant or acceptance device 103. It shall be appreciated that the payment network 105 can include one or more databases and one or more servers configured to forward the transaction authorization request message to a server operated by an issuer 106 that is associated with the payment credentials. According to some non-limiting aspects, the issuer 106 can host one or more accounts owned by user 102. As such, the issuer 106 can either approve or decline the transaction authorization request depending on an account balance, payment history, or spending trends associated with the user 102, for example. Upon approving or declining the transaction, the issuer 106 can generate an authorization response message, which may, in some non-limiting aspects, be formatted according to the ISO 8583 messaging standard. The issuer 106 can transmit the authorization response message to payment network 105.

In further reference to FIG. 1, communications can be sent directly to and from various components of the system 100. For example, according to some non-limiting aspects, the computing device 101 and/or acceptance device 103 can communicate directly with the payment network 105, as depicted in FIG. 1. Furthermore, it shall be appreciated that, according to other non-limiting aspects, communications can be sent to and from various system 100 components via a particular protocol, such as an international standard organization ("ISO") 8583 protocol. For example, the payment network 105 can be configured to communicate with a blockchain network 107, as will be described in further detail in reference to FIG. 2. Moreover, the payment network 105 can implement an application programming interface ("API") configured to enable communication between various applications deployed by the various components of the system 100, such as the computing device 101, the acceptance device 103, the acquirer 104, the issuer 106, and/or the blockchain network 107. For example, the API can be stored in a memory of a server of the payment network 105 and, along with instructions also stored in the memory, can cause the one or more servers of the payment network 105 to perform the methods disclosed herein. For example, via the computing device 101, the user 102 can initiate API calls including information and requests that the payment network 105 can coordinate to resolution on the user's 102 behalf. Additionally, the payment network 105 can allow the API to be called by various third parties and/or third party products (e.g., digital wallets, open banking provider, merchant websites, etc.) to request the NFT attached to unique identifier for the third party display of NFT assets, as will be described in more detail with reference to FIG. 4.

For example, as will be described in more detail with respect to FIG. 3, the user 102 can initiate a request to the payment network 105 to associate a digital asset, such as a multimedia file associated with a non-fungible token ("NFT") hosted on the blockchain network 107, with transactions processed via the system 100 of FIG. 1. For example, as will be explained in reference to FIGS. 7A and 7B, upon fulfillment of the request, an NFT asset (e.g., a image, a video, etc.) can be displayed on a virtual representation of a payment card associated with the payment credentials used during a transaction. In other words, the multimedia file can be referred to as an "NFT asset" because it has been tokenized, with the resulting token being stored in a distributed ledger 210 (FIG. 2) hosted by the blockchain network 107. Thus, exclusive ownership of the NFT asset can be verified via the blockchain network 107, which makes buying, selling, and trading ownership of the NFT asset verifiable and more secure.

According to the non-limiting aspect of FIG. 1, the user 102 can utilize a platform, or an application, executed by or otherwise accessed via the computing device 101 to generate an API call that includes information associated with the NFT hosted on the blockchain network 107. For example, according to some non-limiting aspects, the platform can be stored on a local memory of the computing device 101 and executed via a processor of the computing device 101. According to other non-limiting aspects, the platform can be hosted on a remote server communicably coupled to the computing device 101, accessed via a web-browser of the computing device 101, and configured to receive user inputs from the computing device 101. Regardless, the API call can include a private key, a public key, and/or a unique identifier, amongst other information associated with the NFT. The payment network 105 can process the API call because it is specifically configured to interface directly with the requisite components of the system 100. Specifically, the payment network 105 can communicate with the blockchain network 107, the issuer 106, the acquirer 104, the merchant device 103, and the computing device 101, such that the payment network 105 can verify the user's 102 exclusive ownership of the NFT asset and associate it with transactions processed by the system 100 of FIG. 1.

Referring now to FIG. 2, a block diagram of a system for implementing a blockchain network 107 configured to host an NFT is depicted in accordance with at least one non-limiting aspect of the present disclosure. According to the non-limiting aspect of FIG. 2, the blockchain network 107 can include one or more nodes 202, 204, 206, 208 configured to interact with each other such that the nodes 202, 204, 206, 208 can collectively host, modify, and verify a distributed ledger 210. In some contexts, the nodes 202, 204, 206, 208 may refer to laptop computers 202, personal computers 204, servers 206, and/or mobile computing devices 208, respectively. For example, according to the non-limiting aspect of FIG. 2, the blockchain network 107 can include one or more laptop computers 202, personal computers 204, servers 206, and/or mobile computing devices 208, such as a smart phone and/or a tablet. However, it shall be appreciated that the non-limiting aspect of FIG. 2 is merely illustrative. As such, the blockchain network 107 can include any number and/or type of nodes 202, 204, 206, 208 necessary to effectively host, modify, and verify a distributed ledger 210. Moreover, certain privileges associated with the distributed ledger 210 can be selectively allocated to certain nodes 202, 204, 206, 208 of the blockchain network 107. For example, most nodes may be configured only to verify or validate the distributed ledger 210, while a select number of nodes may have the ability to modify the distributed ledger 210 and/or generate new blocks.

According to the non-limiting aspect of FIG. 2, the distributed ledger 210 can include records of transactions conducted between accounts associated with the blockchain network 107. For example, the distributed ledger 210 can include records associated with transactions executed via smart contracts, or code that automatically executes all components of an agreement that is then stored in the distributed ledger 210. The code itself can be replicated across the multiple nodes 202, 204, 206, 208 of a blockchain network 107 and, therefore, the distributed ledger 210 and its records benefit from the security, permanence, and immutability provided by the blockchain network 107. Notably, the blockchain network 107 can include any foundational, "layer two," or tributary chain, including chains such as the Bitcoin blockchain, Ethereum, Polygon, Arbitrum, and/or Loopring, amongst others.

In further reference to FIG. 2, a user operating a user device (e.g., one of the nodes 202, 204, 206, 208) or a computing device in communication with a node 202, 204, 206, 208, can initiate a transaction by generating a cryptographically signed message and sending the message to blockchain network 107. The message can include transaction data such as information pertaining to an object of the transaction (e.g., a cryptocurrency, a NFT, etc.), a recipient, and/or an amount associated with the transaction, amongst other information. Once a node 202, 204, 206, 208 receives the message, the node 202, 204, 206, 208 can distribute the message to the other nodes 202, 204, 206, 208 in the blockchain network 107.

According to some non-limiting aspects, each of the nodes 202, 204, 206, 208 of the blockchain network 107 can include the transaction represented in the generated message in a block of other transactions and can attempt to validate or cryptographically solve the block. The first node 202, 204, 206, 208 that solves the block can provide the solution to the other validation nodes for verification, and ledger 210 maintained at each of the nodes 202, 204, 206, 208 can be updated to add the block to the distributed ledger 210 to effect the transaction. As an incentive to cryptographically solve blocks—which consumes electricity and computing resources—select nodes 202, 204, 206, 208 can earn at least a part of a token hosted on the distributed ledger 210 (e.g., a cryptocurrency) and/or a fee for participating in the validation of the block.

As such, it shall be appreciated that the distributed ledger 210—and more generally, the blockchain network 107—of FIG. 2 can be used to track transactions and ownership of any number of digital assets, including NFTs. Thus, because the payment network 105 of FIG. 1 is configured to interface with the blockchain network 107 of FIG. 2, the payment network 105 can confirm the user's 102 (FIG. 1) exclusive ownership of an NFT and an NFT asset in response to an API call received from the user 102 (FIG. 1), via the computing device 101 (FIG. 1). For example, the API call can include a unique identifier (e.g., a personal account number, etc.), as well as a public key and/or a private key, amongst other cryptographic information that can be used to identify and verify ownership of an NFT hosted on the blockchain network 107. Having received the API call from the computing device 101, the payment network 105 can use the public key cryptography to locate the NFT on the blockchain network 107. However, every public key matches to only one private key and thus, exclusive ownership of the NFT and thus, the NFT asset, can only be verified using the provided private key. In other words, similar to cryptocurrencies, anyone can locate wallets and send transactions to an address associated with a public key, but only the private key can unlock the asset and verify the owner as recipient of the asset received in the last transaction recorded in the distributed ledger 210.

Referring now to FIG. 3, a method 300 of enhancing a transaction via an NFT hosted on the blockchain network 107 of FIG. 2 is depicted in accordance with at least one non-limiting aspect of the present disclosure. For example, the method 300 can be executed by the payment network 105 that, as depicted in FIG. 1, is configured to interface not only with the blockchain network 107, but also with the user 102 via the computing device 101, the acceptance device 103, the acquirer 104, and the issuer 106. According to the non-limiting aspect of FIG. 3, the method 300 can include receiving 302 an API call generated by the user 102 via the computing device 101, the acceptance device 103 or the acquirer 104. As previously discussed, the API call can include a request to associate a NFT asset (e.g., a multimedia file such as an image file, a video file, an audio file, etc.) that is associated with a NFT hosted on the blockchain network 107 (FIG. 2), with transactions processed via the system 100 of FIG. 1. For example, the API call can include a unique identifier (e.g., a personal account number, etc.), a private key associated with the NFT, and/or a public key associated with the NFT, amongst other information necessary to verify NFT ownership and process the request.

According to the non-limiting aspect of FIG. 3, having received the API call from the computing device 101, the method 300 can include detecting 304 the NFT on the blockchain network 107 (FIG. 2) based on information extracted from the API call. For example, according to some non-limiting aspects, the payment network 105 (FIG. 1) can detect the NFT on the blockchain network (FIG. 2) based on, at least, a public key associated with the NFT. Once the payment network 105 detects the NFT on the blockchain network 107 (FIG. 2), the method 300 can include authenticating 306 the NFT based on information extracted from the API call. For example, according to some non-limiting aspects, the authenticity or originality of the NFT asset can be verified based on checking the number of variances of the NFT asset on the communications network 108 (FIG. 1) or by analyzing the ownership history on the blockchain network 107. According to some non-limiting aspects, ownership of the NFT can be authenticated based on, at least, a private key associated with the NFT. In other words, if the payment network 105 (FIG. 1) determines that the asset linked to the NFT provided by the computing device 101 (FIG. 1) is not authentic, the payment network 105 (FIG. 1) may not authenticate the user's 102 (FIG. 1) use of the NFT asset and thus, the method 300 can include terminating 312 the process. Thus, via the method 300 of FIG. 3, the payment network 105 (FIG. 1) can validate the authenticity of the NFT asset, ensuring that the NFT asset is an original and not fraudulent.

However, in further reference to the non-limiting aspect of FIG. 3, if the payment network 105 (FIG. 1) determines that the private key provided by the computing device 101 (FIG. 1) contains a private key that corresponds to the public key associated with the NFT hosted on the blockchain network 107 (FIG. 2) and the NFT asset's originality and authenticity is validated, the payment network 105 (FIG. 1) can authenticate the user's 102 (FIG. 1) exclusive ownership of the NFT. Accordingly, assuming the user's 102 (FIG. 1) ownership of the NFT is authenticated, the method 300 can include the payment network 105 (FIG. 1) storing 308 the NFT asset in association with the unique identifier, the private key, and the public key via a server of the payment network 105 (FIG. 1). The method can then call for transmitting 310 the NFT asset for use in association with transactions associated with the unique identifier. For example, the NFT asset can be transmitted to the computing device 101 (FIG. 1) of the user 102 (FIG. 1) and/or the acceptance device 103 (FIG. 3), which can include, for example, a point-of-sale terminal and/or a server configured to host a third party ecommerce website, as will be described in further detail in reference to FIG. 4. Moreover, according to some non-limiting aspects, the computing device 101 (FIG. 1) and/or the acceptance device 103 (FIG. 3) can be configured to locally store the NFT asset for use in future transactions.

As used herein, configuring the NFT asset for use "in association with a transaction" can include the display of a the NFT asset on a virtual representation of a payment card for the user to select for use in the transaction, the display of a the NFT asset on a virtual representation of a payment card after the user has selected the payment card for use in the transaction, the presentation of the NFT asset upon approval of a transaction made with a linked payment card, and/or the storage of the NFT asset for use in association with future transactions, amongst other uses. As will be described in further detail with reference to FIGS. 7A and 7B, this can include supplanting generic art displayed on a virtual representation of a payment card or supplanting the virtual representation of a payment card itself, as presented by the computing device 101 (FIG. 1) and/or the acceptance device 103 (FIG. 1), with the NFT asset, which can include an image file or a video file. Alternately and/or additionally, as will be described in further detail with reference to FIGS. 8A and 8B, this can include causing the computing device 101 (FIG. 1) and/or the merchant device 103 (FIG. 1) to play the NFT asset, which can include an audio file or an audio-visual file associated with a video file of the NFT asset. According to some non-limiting aspects, the NFT asset can be configured by the payment network 105 (FIG. 1) for use in response to the receipt of an authorization response message for transactions associated with the unique identifier. However, according to other non-limiting aspects, the NFT asset can be configured by the payment network 105 (FIG. 1) for use upon the initiation of a transaction authorization request associated with the unique identifier. In still other non-limiting aspects, the NFT asset can be configured by the payment network 105 (FIG. 1) for use in the display of a unique credential via digital means. Of course, these examples are merely illustrative and the present disclosure contemplates other uses of the NFT asset in transactions associated with the unique identifier.

Referring now to FIG. 4, another method 400 of enhancing a transaction via a NFT hosted on the blockchain network 107 of FIG. 2 is depicted in accordance with at least one non-limiting aspect of the present disclosure. Once again, the method 400 can be executed by the payment network 105 of the system 100 of FIG. 1—more specifically, can include the searching of a database of the payment network 105 (FIG. 1) in response to a third party request. For example, via the method 400 of FIG. 4, a merchant can store, access, and/or otherwise display a user's 102 (FIG. 1) NFT asset in association with transactions associated with the user's payment credentials via the merchant device 103 (FIG. 1). For example, according to the non-limiting aspect of FIG. 4, the merchant can be an ecommerce company (e.g., Amazon®, eBay®, Etsy®, etc.) and the merchant device 103 (FIG. 1) can be a server configured to host an ecommerce platform that is accessed by the user 102 (FIG. 1) via a computing device 101 (FIG. 1). According to other non-limiting aspects, the merchant device 103 (FIG. 1) can be configured to display the NFT asset in association with the payment credentials via a third party wallet application and/or API (e.g., Google® Wallet, Apple® Pay, Amazon® Pay, etc.). The presentation (e.g., display of, playing of, etc.) the NFT asset can occur while the user is selecting the payment credential, after the user has selected a payment credential, and/or after a transaction during which the payment credential was used has been approved.

According to the non-limiting aspect of FIG. 4, the method 400 can include receiving 402 an API call, which can include account information associated with the payment credentials of a user 102 (FIG. 1), such as a unique identifier (e.g., a PAN, etc.), and a request for a NFT asset to be used in association with the user's account information from a computing device 101 (FIG. 1) of the user 102 (FIG. 2). As previously mentioned, the API call can be generated by a third party, such as an ecommerce company via an ecommerce platform through which the user 102 (FIG. 1) is initiating the transaction and/or storing a payment credential. In response to the API call, the method 400 can further include determining 404, via the payment network 105 (FIG. 1), whether the account information is already stored in a database of the payment network 105 (FIG. 1), whether the requested NFT asset is stored in a server of the payment network 105 (FIG. 1), and/or whether the NFT asset is linked to the account information stored in a database of the payment network 105 (FIG. 1). If these conditions are satisfied, the method 400 can include transmitting 410, via the payment network 105 (FIG. 1), the NFT asset to the third party for storage and/or use in transactions associated with account information associated with the payment credentials of a user 102 (FIG. 1). Subsequently, the method 400 can include terminating 412 the process.

However, if the payment network 105 (FIG. 1) determines that the NFT asset and/or the account information are not stored or linked in a database of the payment network 105 (FIG. 1), the method 400 can further include storing 406 the received API call in a database of the payment network 105 (FIG. 1). As such, the method 400 can further include linking 407 a new and/or existing payment credential to a new NFT asset, in response to the received API call and determining 408 if the payment credential is stored in a database of the payment network 105 (FIG. 1) in association with a prior API request. The payment network 105 (FIG. 1) can transmit 410 the newly stored NFT asset associated with the prior NFT API request associated with the relevant payment credential to the 3$^{rd}$ party that previously requested the NFT asset. If there has never been an API request for the NTF associated with the payment credential, the method 400 can be terminated 412, although the payment network 105 (FIG. 1) may proceed with the detection 304, authentication 306, and storage 308 of the NFT asset, as described in reference to FIG. 3. Once stored in the database, the payment network 105 (FIG. 1) can transmit 410 the NFT asset to the third party for storage and/or use in association transaction associated with the account information.

Referring now to FIG. 5, a method 500 of continuously authenticating a NFT hosted on the blockchain network 107 of FIG. 2 for the continued enhancement of payment credential storage and/or transactions associated with payment credentials is depicted in accordance with at least one non-limiting aspect of the present disclosure. For example, the authentication contemplated by FIG. 5 can include an authentication of the ownership, originality, and/or authenticity of the NFT asset, amongst of characteristics capable of being authenticated and/or verified by the blockchain network 107 (FIG. 2). The payment network 105 (FIG. 1) can implement the method 500 of FIG. 5 once the NFT asset is stored in association with account information associated with the user (e.g., payment credentials, private keys, public keys, etc.) and transmitted to the computing device 101 (FIG. 1) for storage and/or use in association with transactions associated with the payment credentials, as described in reference to FIG. 3. According to the non-limiting aspect of FIG. 5, the method 500 can include initiating 502 an authentication request associated with the NFT according to a predetermined time interval. For example, the payment network 105 (FIG. 1) can be configured to continuously authenticate the NFT via the blockchain network 107 (FIG. 2) every minute, every hour, every day, every week, and/or every year, according to user preference and/or intended application. The payment network 105 (FIG. 1), for example, can be configured to interrogate the blockchain network 107 (FIG. 2) once the NFT asset is stored in association with account information associated with the user, via the one or more APIs.

In further reference to FIG. 5, the method 500 can include determining 504 whether the NFT remains authenticated and should remain associated with the user's account. Assuming the payment network 105 (FIG. 1) determines that the NFT I authenticated, the method 500 can include terminating 506 the process. In other words, the method 500 can include preserving the user's 102 (FIG. 1)—and more specifically, the computing device's 101 (FIG. 1)—ability to use the NFT asset of the user 102 (FIG. 1) in association with transactions associated with the unique identifier. Likewise, the method 500 can enable the payment network 105 (FIG. 1) to retain storage of the NFT asset in a database of the payment network 105 (FIG. 1) until the payment network 105 (FIG. 1) is no long able to determine that the owner of the associated account continues to own the NFT associated with the NFT asset.

Still referring to FIG. 5, if the payment network 105 (FIG. 1) determines that the NFT is no longer associated, the method 500 can include transmitting 508 a notification to the user—and more specifically, computing device 101 (FIG. 1)—indicating that the NFT asset is no longer authenticated (FIG. 1) and should no longer be associated with the payment credential of the user 102 (FIG. 1). Accordingly, the method 500 can further include disassociating 510 the NFT from account information of the user 102 (FIG. 1) in the database of the payment network 105 (FIG. 1). According to some non-limiting aspects, the NFT can be deleted from the database of the payment network 105 (FIG. 1). However, according to other non-limiting aspects, the NFT can be retained by the database of the payment network 105 (FIG. 1) until another user issues an API call requesting that the payment network 105 (FIG. 1) authenticate the NFT. Regardless, according to the non-limiting aspect of FIG. 5, the method 500 can preclude the original user 102 (FIG. 1)—and more specifically, the computing device's 101 (FIG. 1) and/or acceptance device's 103 (FIG. 1) or a third party's (e.g., an ecommerce website, etc.)—from storing and/or using the NFT asset in association with transactions associated with the unique identifier.

Referring now to FIG. 6, another method 500 of enhancing a transaction via a NFT hosted on the blockchain network 107 of FIG. 2 is depicted in accordance with at least one non-limiting aspect of the present disclosure. The method 600 of FIG. 6 can be implemented by the system 100 of FIG. 1 to assess whether a user 102 (FIG. 1) has already linked an NFT asset with account information for use during a transaction. According to the non-limiting aspect of FIG. 6, the method 600 can include a user 102 (FIG. 1) initiating 602 a transaction, for example, via a computing device 101 (FIG. 1). For example, according to some non-limiting aspects a payment card can be implemented and/or include a computing device 101 (FIG. 1), due to the chip technology within the computing device 101 (FIG. 1). Thus, a transaction can be initiated by the computing device 101 via a unique identifier. As such, the method 600 can further include the computing device 101 (FIG. 1) transmitting 604 an API call with account information of the user 102 (FIG. 1) to the payment network 105 (FIG. 1). Upon receiving the API call, the method 600 can include determining 606, via the payment network 105 (FIG. 1), whether the account information in the API call is associated with an NFT asset stored in a database of the payment network 105 (FIG. 1).

According to the non-limiting aspect of FIG. 6, assuming the payment network 105 (FIG. 1) determines that the account information in the API call is associated with an NFT asset stored in a database of the payment network 105 (FIG. 1), the method 600 can further include transmitting 608, via the payment network 105 (FIG. 1), the NFT asset to the acquirer 104 (FIG. 1) and/or acceptance device 103 (FIG. 1). Accordingly, the method 600 can include displaying 610 the NFT asset upon the requested transaction being authorized by the acquirer 104 (FIG. 1). For example, the NFT asset can be displayed by the computing device 101 (FIG. 1) of the user 102 (FIG. 1) and/or the acceptance device 103 (FIG. 1). However, if the payment network 105 (FIG. 1) determines that the account information in the API call is not associated with an NFT asset stored in a database of the payment network 105 (FIG. 1), the method 600 can further include terminating 612 the process.

Referring now to FIGS. 7A and 7B, a block diagram of the presentation of a NFT asset 712 on via the computing device 101 of the system of FIG. 1 is depicted in accordance with at least one non-limiting aspect of the present disclosure. According to the non-limiting aspect of FIGS. 7A and 7B, the computing device 101 can include a smartphone of a user 102 (FIG. 1). However, according to other non-limiting aspects, the computing device can include other computing devices, such as smartwatches, mobile computers, and/or tablets, amongst other devices configured to access account information and transmit payment credentials to acceptance devices 103 (FIG. 1). For example, the computing device 101 can present the NFT asset 712 upon initiating a transaction in association with a payment credential, such as a unique identifier. According to still other non-limiting aspects, it shall be appreciated that the NFT asset 712 can be displayed via the acceptance device 103 (FIG. 1) of the system of FIG. 1 in a similar manner illustrated in FIGS. 7A and 7B. For example, the acceptance device 103 (FIG. 1) can present the NFT asset 712 similar to how it is depicted in FIGS. 7A and 7B upon approval of a transaction in association with a payment credential, such as a unique identifier. However, according to still other non-limiting aspects, the acceptance device 103 can include a server configured to host a third-party ecommerce website config-ured to present the NFT asset 712 similar to how it is depicted in FIGS. 7A and 7B for a customer's selection of the payment credential and/or upon approval of a transaction in association with a payment credential.

In further reference to the non-limiting aspect of FIG. 7A, the computing device 101 can include a visual display 702 configured to present a virtual representation 704 of a payment credential, such as a card, of the user 102 (FIG. 1). For example, the representation 704 can include a name 708 of a user, an expiration date 710 of the card and a PAN 706. In other words, the virtual representation 704 of the card can be visually similar to a physical card of the user 102 (FIG. 1). The display 702 can further include an instruction 711 informing the user 102 (FIG. 1) to hold the computing device 101 close to a reading device of the merchant device 103 (FIG. 1).

However, according to the non-limiting aspect of FIG. 7B, the system 100 of FIG. 1—and more specifically, the payment network 105 (FIG. 1) of the system 100 of FIG. 1—has enhanced the transaction for the user 102 (FIG. 1) via any of the methods 300, 400, 500, 600 of FIGS. 3-6. In other words, the payment network 105 (FIG. 1) has authen-ticated the user 102 (FIG. 1) as the exclusive owner of a NFT hosted by the blockchain network 107 of FIG. 2. The payment network 105 (FIG. 1) has authenticated the origi-nality and authenticity of the NFT asset 712. As such, the payment network 105 (FIG. 5) has stored an NFT asset 712 in a database and linked the NFT asset 712 to the user's 102 (FIG. 1) account information. Accordingly, the payment network 105 (FIG. 1) has transmitted the NFT asset 712 to the acquirer 104 (FIG. 1) and/or the acceptance device 103 (FIG. 1) and/or the computing device 101 of the user 102 (FIG. 1) and thus, the NFT asset 712 is displayed on the virtual representation 704 of the card in lieu of the conven-tional card information (PAN 706, name 708, expiration date 710), as depicted in FIG. 7A. In still other non-limiting aspects, the methods 300, 400, 500, 600 of FIG. 3-6 can be repeated and/or attenuated such that numerous NFTs are authenticated via the blockchain network 107 (FIG. 2) and thus, numerous NFT assets can be embossed on the virtual representation 704 of the card (e.g., NFT assets of the user, NFT assets of the issuer, NFT assets of the payment net-work, etc.). In still other non-limiting aspects, the methods 300, 400, 500, 600 of FIG. 3-6 can be repeated and/or attenuated such that the NFT asset replaces the card in its image and form on a digital device entirely so that the NFT asset becomes the full and only representation of the pay-ment credential.

Still referring to FIG. 7B, display of the virtual represen-tation 704 and NFT asset 712 can occur upon initiation of a transaction request and/or authorization of an initiated trans-action request via the system 100 of FIG. 1. Additionally and/or alternately the virtual representation 704 of the card—including the NFT asset 712—can be displayed on a display of the acceptance device 103 (FIG. 1), in a similar manner as it is displayed on the computing device 101 of FIG. 7B. Although the NFT asset 712 of FIG. 7B is depicted as a still image, it shall be appreciated that, according to other non-limiting aspects, the NFT asset 712 can include any other type of multimedia file, such as a video. Likewise, according to other non-limiting aspects, the NFT asset 712 need not be constrained to a virtual representation 704 of the card. For example, according to some non-limiting aspects, the NFT asset 712 can occupy the entire screen of the display 702 of the computing device, or any other virtual form presented on the display 702. The computing device 101 can display an approval 713 for the user to approve a transaction.

Referring now to FIGS. 8A and 8B, a block diagram of the presentation of a NFT asset 816 on via the computing device 101 of the system of FIG. 1 is depicted in accordance with at least one non-limiting aspect of the present disclosure. Once again, according to the non-limiting aspect of FIGS. 8A and 8B, the computing device 101 can include a smart-phone of a user 102 (FIG. 1). However, according to other non-limiting aspects, the computing device can include other computing devices, such as smartwatches, mobile computers, and/or tablets, amongst other devices configured to access account information and transmit payment creden-tials to merchant devices 103 (FIG. 1). According to still other non-limiting aspects, it shall be appreciated that the NFT asset 816 can be presented via the acceptance device 103 (FIG. 1) of the system of FIG. 1 in a similar manner illustrated in FIGS. 8A and 8B. The computing device 101 can display an approval 813 for the user to approve a transaction.

Similar to the computing device 101 depicted in FIGS. 7A and 7B, the computing device 101 of FIGS. 8A and 8B can include a display 802 (e.g., a visual display) configured to present a virtual representation 704 of a payment credential, such as a card, of the user 102 (FIG. 1) as well as an instruction 811 informing the user 102 (FIG. 1) to hold the computing device 101 close to a reading device of the merchant device 103 (FIG. 1). However, according to the non-limiting aspect of FIGS. 8A and 8B, the computing device 101 can further include a speaker 814 configured to play an audio file, such that the computing device 101 can play NFT assets that are audio files and/or include audible components, such as videos.

For example, according to the non-limiting aspect of FIG. 8B, the system 100 of FIG. 1—and more specifically, the payment network 105 (FIG. 1) of the system 100 of FIG. 1—has enhanced the transaction for the user 102 (FIG. 1) via any of the methods 300, 400, 500, 600 of FIGS. 3-6. In other words, the payment network 105 (FIG. 1) has authen-ticated the user 102 (FIG. 1) as the exclusive owner of a NFT hosted by the blockchain network 107 of FIG. 2. As such, the payment network 105 (FIG. 5) has stored an NFT asset 816 in a database and linked the NFT asset 816 to the user's 102 (FIG. 1) account information after authenticating the NFT asset's originality and authenticity. Accordingly, the pay-ment network 105 (FIG. 1) has transmitted the NFT asset 816 to the acquirer 104 (FIG. 1), acceptance device 103 and/or the computing device 101 of the user 102 (FIG. 1) and thus, the NFT asset 816—which, according to the non-limiting aspect of FIG. 8B, includes an audio file—can can be played via the speaker 814 of the computing device 101.

According to some non-limiting aspects, the NFT asset 816 may be audible and can be played while a virtual representation 804 of the card is presented on a display 802 of the computing device 101, as depicted in FIG. 8B. According to still other non-limiting aspects, the NFT asset can include an audible and visual component. As such, the audible component can be played via the speaker 814 as the visual component is presented on the virtual representation 804 of the card, as depicted in FIG. 7B. The visual component can include a static image or a video file. Moreover, presentation of the NFT asset 816 can occur upon initiation of a transaction request and/or authorization of an initiated transaction request via the system 100 of FIG. 1. Additionally and/or alternately, the presentation of the NFT asset 816 can be played on a speaker of the acceptance device 103 (FIG. 1), in a similar manner as it is played on the speaker 814 of the computing device 101 of FIG. 8B.

It shall be appreciated that transactions processed by the system 100 (FIG. 1), methods 300, 400, 500, 500 (FIGS. 3-6), and computing devices 101 (FIGS. 1, 7A, 7B, 8A, and 8B) disclosed herein are described in reference to account information, including PANs, such as those associated with a credit, debit, and/or bank account of the user 102 (FIG. 1). However, it shall be appreciated that, according to other non-limiting aspects, the payment network 105 (FIG. 1) and/or the acquirer 104 (FIG. 1) can be alternately configured to accept a percentage of the intrinsic and/or market value of the NFT hosted on the blockchain network 107 (FIG. 7) as collateral for the transaction. Likewise, according to other non-limiting aspect, NFT information (e.g., a public key) can be used in lieu of account identifying information, such as the unique identifier or PAN associated with the payment credential. Thus, the NFT asset can serve as a wholesale replacement for the payment credential and, in some non-limiting aspects, can completely supplant the need for an issuer 106 (FIG. 1).

Additionally, it shall be appreciated that transactions processed by the system 100 (FIG. 1), methods 300, 400, 500, 500 (FIGS. 3-6), and computing devices 101 (FIGS. 1, 7A, 7B, 8A, and 8B) disclosed herein can provide enhanced security, as the blockchain network 107 (FIG. 2) of the system 100 (FIG. 1) provides cryptographic encryption of a ledger 210 (FIG. 2) that is distributed across a blockchain network 107 (FIG. 2) of various nodes 202, 204, 206, 208, each configured to verify the integrity of the ledger 210 (FIG. 2). Coupled with biometric sensors on the computing device 101 (FIG. 1), the system 100 (FIG. 1) can process transactions with enhanced transparency and security.

For example, the presentation of an NFT asset—such as NFT asset 712 of FIG. 7B and NFT asset 816 of FIG. 8B—by a merchant device 103 (FIG. 1) of a third party can assure the user 102 (FIG. 1) that the acceptance device 103 (FIG. 1) is legitimate and authenticated by the payment network 105 (FIG. 1). According to non-limiting aspects where the merchant is an ecommerce company (e.g., Amazon®, eBay®, Etsy®, etc.), the merchant device 103 (FIG. 1) can be a server configured to host an ecommerce platform that is accessed by the user 102 (FIG. 1) via a computing device 101 (FIG. 1). A non-merchant party can attempt to replicate the ecommerce platform in an attempt to trick the user 102 (FIG. 1) into submitting sensitive information, such as a full PAN number, by misleading the user into believing this is already know by the website due to the display of a partial e.g. the last 4 digits and there is a need to confirm the full PAN. However, because the replicated platform does not have access to the full PAN it is not able to retrieve the NFT associated with the full PAN from the payment network 105 (FIG. 1) and therefore the website is not personalized or verified that the website is already or has been in possession of the full PAN creating a red flag to the user and dissuading the submission of sensitive information. In other non-limiting aspects, the fraudulent website would not have access to the payment network 105 (FIG. 1), it also cannot present the NFT asset to the user 102 (FIG. 2), creating a red flag to the user also dissuading the submission of sensitive information such as the CVV2.

The display of an NFT asset in association with a transaction can provide still more benefits. For example, the NFT asset can serve as a visual indicia that enhances the communication to the user 102 (FIG. 1) that the transaction was authorized. This can mitigate the risk of a user 102 (FIG. 1) being charged twice for the same transaction. Additionally, the NFT asset can ensure that the user 102 (FIG. 1) that the correct payment credential, or payment card, was used in the transaction. Moreover, according to some non-limiting aspects, the NFT asset can include user 102 (FIG. 1) identifying information (e.g., a photo, a description, etc.). Thus, when the NFT asset is presented, the merchant can verify the user 102 (FIG. 1) as an authorized owner of the payment credential. According to still other non-limiting aspects, the system 100 (FIG. 1) can further personalize a transaction by enabling a user 102 (FIG. 1) to store one or more predetermined rules associated with the payment credential on the blockchain network 107 (FIG. 2). As such, the payment network 105 (FIG. 1) can access the one or more predetermined rules via the blockchain network 107 (FIG. 2). For example, according to some non-limiting aspects, the one or more rules can be conditional (e.g., if module "A" is true, then block all transactions at the Bar MCC category, etc.). Module A, for example, can be stored on the blockchain network 107 (FIG. 2). According to some non-limiting aspects, Module A can be configured to confirm whether a balance of the user's 102 (FIG. 1) account exceeds a certain threshold and/or confirm a location of the user 102 (FIG. 1) and/or confirm a location of the user 102 (FIG. 1) and/or acceptance device 103 (FIG. 1) at which the payment credential is being used, for example. Accordingly, according to some non-limiting aspects, Module A can be configured to communicate with the issuer 106 (FIG. 1) system and/or a source of locational information (e.g., the internet, a geolocation positional system ("GPS"), a third-party map application, etc.).

The system and system components described herein with reference to FIGS. 1 and 2 may operate via one or more computer apparatuses to facilitate the functions described herein. Further, the one or more computer apparatuses may use any suitable number of subsystems to facilitate the functions described herein. Examples of such subsystems or components are shown in FIG. 9. The subsystems 1000 shown in FIG. 9 are interconnected via a system bus 1010. Additional subsystems such as a printer 1018, keyboard 1026, fixed disk 1028 (or other memory comprising computer readable media), monitor 1022, which is coupled to display adapter 1020, and others are shown. Peripherals and input/output (I/O) devices, which couple to I/O controller 1012 (which can be a processor or other suitable controller), can be connected to the computer system by any number of means known in the art, such as serial port 1024. For example, serial port 1024 or external interface 1030 can be used to connect the computer apparatus to a wide area network such as the Internet, a mouse input device, or a scanner. The interconnection via system bus 1010 allows the central processor 1016 to communicate with each subsystem and to control the execution of instructions from system memory 1014 or the fixed disk 1028, as well as the exchange of information between subsystems. The system memory 1014 and/or the fixed disk 1028 may embody a computer readable medium.

Referring now to FIG. 10, a diagrammatic representation of an example system 4000 that includes a host machine 4002 within which a set of instructions to perform any one or more of the methodologies discussed herein may be executed, according to at least one aspect of the present disclosure. In various aspects, the host machine 4002 operates as a standalone device or may be connected (e.g., networked) to other machines. In a networked deployment, the host machine 4002 may operate in the capacity of a server or a client machine in a server-client network environment, or as a peer machine in a peer-to-peer (or distributed) network environment. The host machine 4002 may be a computer or computing device, a personal computer (PC), a tablet PC, a set-top box (STB), a personal digital assistant (PDA), a cellular telephone, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example system 4000 includes the host machine 4002, running a host operating system (OS) 4004 on a processor or multiple processor(s)/processor core(s) 4006 (e.g., a central processing unit (CPU), a graphics processing unit (GPU), or both), and various memory nodes 4008. The host OS 4004 may include a hypervisor 4010 which is able to control the functions and/or communicate with a virtual machine ("VM") 4012 running on machine readable media. The VM 4012 also may include a virtual CPU or vCPU 4014. The memory nodes 4008 may be linked or pinned to virtual memory nodes or vNodes 4016. When the memory node 4008 is linked or pinned to a corresponding vNode 4016, then data may be mapped directly from the memory nodes 4008 to their corresponding vNodes 4016.

All the various components shown in host machine 4002 may be connected with and to each other, or communicate to each other via a bus (not shown) or via other coupling or communication channels or mechanisms. The host machine 4002 may further include a video display, audio device or other peripherals 4018 (e.g., a liquid crystal display (LCD), alpha-numeric input device(s) including, e.g., a keyboard, a cursor control device, e.g., a mouse, a voice recognition or biometric verification unit, an external drive, a signal generation device, e.g., a speaker,) a persistent storage device 4020 (also referred to as disk drive unit), and a network interface device 4022. The host machine 4002 may further include a data encryption module (not shown) to encrypt data. The components provided in the host machine 4002 are those typically found in computer systems that may be suitable for use with aspects of the present disclosure and are intended to represent a broad category of such computer components that are known in the art. Thus, the system 4000 can be a server, minicomputer, mainframe computer, or any other computer system. The computer may also include different bus configurations, networked platforms, multi-processor platforms, and the like. Various operating systems may be used including UNIX, LINUX, WINDOWS, QNX ANDROID, IOS, CHROME, TIZEN, and other suitable operating systems.

The disk drive unit 4024 also may be a Solid-state Drive (SSD), a hard disk drive (HDD) or other includes a computer or machine-readable medium on which is stored one or more sets of instructions and data structures (e.g., data/instructions 4026) embodying or utilizing any one or more of the methodologies or functions described herein. The data/instructions 4026 also may reside, completely or at least partially, within the main memory node 4008 and/or within the processor(s) 4006 during execution thereof by the host machine 4002. The data/instructions 4026 may further be transmitted or received over a network 4028 via the network interface device 4022 utilizing any one of several well-known transfer protocols (e.g., Hyper Text Transfer Protocol (HTTP)).

The processor(s) 4006 and memory nodes 4008 also may comprise machine-readable media. The term "computer-readable medium" or "machine-readable medium" should be taken to include a single medium or multiple medium (e.g., a centralized or distributed database and/or associated caches and servers) that store the one or more sets of instructions. The term "computer-readable medium" shall also be taken to include any medium that is capable of storing, encoding, or carrying a set of instructions for execution by the host machine 4002 and that causes the host machine 4002 to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example aspects described herein may be implemented in an operating environment comprising software installed on a computer, in hardware, or in a combination of software and hardware.

One skilled in the art will recognize that Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized to implement any of the various aspects of the disclosure as described herein.

The computer program instructions also may be loaded onto a computer, a server, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Suitable networks may include or interface with any one or more of, for instance, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, Digital Data Service (DDS) connection, DSL (Digital Subscriber Line) connection, an Ethernet connection, an ISDN (Integrated Services Digital Network) line, a dial-up port such as a V.90, V.34 or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), CDMA (Code Division Multiple Access) or TDMA (Time Division Multiple Access), cellular phone networks, GPS (Global Positioning System), CDPD (cellular digital packet data), RIM (Research in Motion, Limited) duplex paging network, Bluetooth radio, or an IEEE 802.11-based radio frequency network. The network can further include or interface with any one or more of an RS-232 serial connection, an IEEE-1394 (Firewire) connection, a Fiber Channel connection, an IrDA (infrared) port, a SCSI (Small Computer Systems Interface) connection, a USB (Universal Serial Bus) connection or other wired or wireless, digital or analog interface or connection, mesh or Digi® networking.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud is formed, for example, by a network of web servers that comprise a plurality of computing devices, such as the host machine 4002, with each server 4030 (or at least a plurality thereof) providing processor and/or storage resources. These servers manage workloads provided by multiple users (e.g., cloud resource customers or other users). Typically, each user places workload demands upon the cloud that vary in real-time, sometimes dramatically. The nature and extent of these variations typically depends on the type of business associated with the user.

It is noteworthy that any hardware platform suitable for performing the processing described herein is suitable for use with the technology. The terms "computer-readable storage medium" and "computer-readable storage media" as used herein refer to any medium or media that participate in providing instructions to a CPU for execution. Such media can take many forms, including, but not limited to, non-volatile media, volatile media, and transmission media. Non-volatile media include, for example, optical or magnetic disks, such as a fixed disk. Volatile media include dynamic memory, such as system RAM. Transmission media include coaxial cables, copper wire and fiber optics, among others, including the wires that comprise one aspect of a bus. Transmission media can also take the form of acoustic or light waves, such as those generated during radio frequency (RF) and infrared (IR) data communications. Common forms of computer-readable media include, for example, a flexible disk, a hard disk, magnetic tape, any other magnetic medium, a CD-ROM disk, digital video disk (DVD), any other optical medium, any other physical medium with patterns of marks or holes, a RAM, a PROM, an EPROM, an EEPROM, a FLASH EPROM, any other memory chip or data exchange adapter, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Computer program code for carrying out operations for aspects of the present technology may be written in any combination of one or more programming languages, including an object oriented programming language such as Java, Smalltalk, C++, or the like and conventional procedural programming languages, such as the "C" programming language, Go, Python, or other programming languages, including assembly languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Examples of the devices, systems, and methods disclosed herein, according to various aspects of the present disclosure, are provided below in the following numbered clauses. An aspect of the devices, systems, and methods may include any one or more than one, and any combination of, the numbered clauses described below.

Clause 1: A method for personalizing a transaction via a blockchain network, the method including receiving, via a payment network, an application programming interface ("API") call from a computing device of a user, wherein the API call includes a private key, a public key, and a unique identifier, detecting, via the payment network, a non-fungible token ("NFT") on the blockchain network based on the public key, authenticating, via the payment network, the NFT on the blockchain network based on the private key, storing, via the payment network, an NFT asset associated with the NFT, the private key, the public key, and the unique identifier, based on a successful authentication of the NFT, associating, via the payment network, the unique identifier with the NFT based on the successful authentication of the NFT, and transmitting, via the payment network, the NFT asset, wherein the NFT asset is configured for use in association with a transaction associated with the unique identifier.

Clause 2: The method according to clause 1, further including continuously authenticating, via a server component of the payment network, the NFT based on the private key after the private key, the public key, and the unique identifier have been stored.

Clause 3: The method according to either of clauses 1 or 2, further including detecting, via the payment network, that the user no longer owns the NFT, and disassociating, via the payment network, the unique identifier from the NFT for future transactions associated with the unique identifier.

Clause 4: The method according to any of clauses 1-3, further including transmitting, via the payment network, a notification to the computing device indicating that the NFT asset can no longer be used with the unique identifier disassociated from the NFT.

Clause 5: The method according to any of clauses 1-4, wherein the API call is a first API call, and wherein the method further includes receiving, via the payment network, a second API call including a transaction request associated with the unique identifier from a merchant device, confirming, via the payment network, that the unique identifier is associated with the NFT asset, confirming, via the payment network, that the NFT asset is stored by the payment network; and transmitting, via the payment network, the NFT asset for presentation via the merchant device.

Clause 6: The method according to any of clauses 1-5, further including presenting, via the acceptance device, the NFT asset in response to an authorization of the transaction request by an issuer system.

Clause 7: The method according to any of clauses 1-6, wherein the NFT asset includes a multimedia object.

Clause 8: The method according to any of clauses 1-7, wherein the NFT asset is configured for at least one of playing an audible component of the multimedia object on a speaker or displaying a visual component of the multimedia object on a display.

Clause 9: The method according to any of clauses 1-8, wherein the unique identifier includes a personal account number ("PAN") associated with a payment card of the user.

Clause 10: The method according to any of clauses 1-9, wherein the NFT asset is configured for displaying a visual component of the multimedia object on a virtual representation of the payment card of the user via a display.

Clause 11: A payment network configured to personalize a transaction via a blockchain network, the payment network including a database, and a server including a processor and a memory configured to store an application program interface ("API") and instructions that, when executed by the processor, cause the payment network to receive an API call from a computing device of a user, wherein the API call includes a private key, a public key, and a unique identifier associated with a payment device of the user, detect a non-fungible token ("NFT") on the blockchain network based on the public key, authenticate the NFT on the blockchain network based on the private key, store an NFT asset associated with the NFT, the private key, the public key, and the unique identifier in the database based on a successful authentication of the NFT, associate the unique identifier with the NFT based on the successful authentication of the NFT, and transmit the NFT asset, wherein the NFT asset is configured for use in association with a transaction associated with the payment device.

Clause 12: The payment network according to clause 11, wherein, when executed by the processor, the API and instructions further cause the processor to continuously authenticate the NFT based on the private key after the private key, the public key, and the unique identifier have been stored in the database.

Clause 13: The payment network according to either of clauses 11 or 12, wherein, when executed by the processor, the API and instructions further cause the processor to detect that the user no longer owns the NFT, and disassociate the unique identifier from the NFT for future transactions associated with the payment device.

Clause 14: The payment network according to any of clauses 11-13, wherein the API call is a first API call, and wherein, when executed by the processor, the API and instructions further cause the processor to receive a second API call including a transaction request associated with the unique identifier from a merchant device, confirm that the unique identifier is associated with the NFT asset, confirm that the NFT asset is stored by the payment network, and transmit the NFT asset for presentation via the merchant device.

Clause 15: The payment network according to any of clauses 11-14, wherein the NFT asset includes a multimedia object.

Clause 16: The payment network according to any of clauses 11-15, wherein the NFT asset is configured for at least one of playing an audible component of the multimedia object on a speaker or displaying a visual component of the multimedia object on a display.

Clause 17: The payment network according to any of clauses 11-16, wherein the NFT asset is configured for displaying a visual component of the multimedia object on a virtual representation of the payment device of the user via a display.

Clause 18: A system for personalizing a transaction via a blockchain network, the system including a computing device of a user, and a payment network including a database, and a server including a processor and a memory configured to store an application program interface ("API") and instructions that, when executed by the processor, cause the payment network to receive an API call from a computing device of a user, wherein the API call includes a private key, a public key, and a unique identifier associated with a payment device of the user, detect a non-fungible token ("NFT") on the blockchain network based on the public key, authenticate the NFT on the blockchain network based on the private key, store an NFT asset associated with the NFT, the private key, the public key, and the unique identifier in the database based on a successful authentication of the NFT, associate the unique identifier with the NFT based on the successful authentication of the NFT, and transmit the NFT asset, wherein the NFT asset is configured for use in association with a transaction associated with the payment device.

Clause 19: The system according to clause 18, wherein the NFT asset includes a multimedia object.

Clause 20: The payment network according to either of clauses 18 or 19, wherein the NFT asset is configured for at least one of playing an audible component of the multimedia object on a speaker or displaying a visual component of the multimedia object on a display.

The foregoing detailed description has set forth various forms of the systems and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, and/or examples can be implemented, individually and/or collectively, by a wide range of hardware, software, firmware, or virtually any combination thereof. Those skilled in the art will recognize that some aspects of the forms disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as one or more program products in a variety of forms, and that an illustrative form of the subject matter described herein applies regardless of the particular type of signal bearing medium used to actually carry out the distribution.

Instructions used to program logic to perform various disclosed aspects can be stored within a memory in the system, such as dynamic random access memory (DRAM), cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, compact disc, read-only memory (CD-ROMs), and magneto-optical disks, read-only memory (ROMs), random access memory (RAM), erasable programmable read-only memory (EPROM), electrically erasable programmable read-only memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the non-transitory computer-readable medium includes any type of tangible machine-readable medium suitable for storing or transmitting electronic instructions or information in a form readable by a machine (e.g., a computer).

Any of the software components or functions described in this application, may be implemented as software code to be executed by a processor using any suitable computer language such as, for example, Python, Java, C++ or Perl using, for example, conventional or object-oriented techniques. The software code may be stored as a series of instructions, or commands on a computer readable medium, such as RAM, ROM, a magnetic medium such as a hard-drive or a floppy disk, or an optical medium such as a CD-ROM. Any such computer readable medium may reside on or within a single computational apparatus, and may be present on or within different computational apparatuses within a system or network.

As used in any aspect herein, the term "logic" may refer to an app, software, firmware and/or circuitry configured to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices.

As used in any aspect herein, the terms "component," "system," "module" and the like can refer to a computer-related entity, either hardware, a combination of hardware and software, software, or software in execution.

As used in any aspect herein, an "algorithm" refers to a self-consistent sequence of steps leading to a desired result, where a "step" refers to a manipulation of physical quantities and/or logic states which may, though need not necessarily, take the form of electrical or magnetic signals capable of being stored, transferred, combined, compared, and otherwise manipulated. It is common usage to refer to these signals as bits, values, elements, symbols, characters, terms, numbers, or the like. These and similar terms may be associated with the appropriate physical quantities and are merely convenient labels applied to these quantities and/or states.

A network may include a packet switched network. The communication devices may be capable of communicating with each other using a selected packet switched network communications protocol. One example communications protocol may include an Ethernet communications protocol which may be capable of permitting communication using a Transmission Control Protocol/Internet Protocol (TCP/IP). The Ethernet protocol may comply or be compatible with the Ethernet standard published by the Institute of Electrical and Electronics Engineers (IEEE) titled "IEEE 802.3 Standard", published in December 2008 and/or later versions of this standard. Alternatively or additionally, the communication devices may be capable of communicating with each other using an X.25 communications protocol. The X.25 communications protocol may comply or be compatible with a standard promulgated by the International Telecommunication Union-Telecommunication Standardization Sector (ITU-T). Alternatively or additionally, the communication devices may be capable of communicating with each other using a frame relay communications protocol. The frame relay communications protocol may comply or be compatible with a standard promulgated by Consultative Committee for International Telegraph and Telephone (CCITT) and/or the American National Standards Institute (ANSI). Alternatively or additionally, the transceivers may be capable of communicating with each other using an Asynchronous Transfer Mode (ATM) communications protocol. The ATM communications protocol may comply or be compatible with an ATM standard published by the ATM Forum titled "ATM-MPLS Network Interworking 2.0" published August 2001, and/or later versions of this standard. Of course, different and/or after-developed connection-oriented network communication protocols are equally contemplated herein.

Unless specifically stated otherwise as apparent from the foregoing disclosure, it is appreciated that, throughout the present disclosure, discussions using terms such as "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

One or more components may be referred to herein as "configured to," "configurable to," "operable/operative to," "adapted/adaptable," "able to," "conformable/conformed to," etc. Those skilled in the art will recognize that "configured to" can generally encompass active-state components and/or inactive-state components and/or standby-state components, unless context requires otherwise.

Those skilled in the art will recognize that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flow diagrams are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

It is worthy to note that any reference to "one aspect," "an aspect," "an exemplification," "one exemplification," and the like means that a particular feature, structure, or characteristic described in connection with the aspect is included in at least one aspect. Thus, appearances of the phrases "in one aspect," "in an aspect," "in an exemplification," and "in one exemplification" in various places throughout the specification are not necessarily all referring to the same aspect. Furthermore, the particular features, structures or characteristics may be combined in any suitable manner in one or more aspects.

Any patent application, patent, non-patent publication, or other disclosure material referred to in this specification and/or listed in any Application Data Sheet is incorporated by reference herein, to the extent that the incorporated materials is not inconsistent herewith. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material. None is admitted to be prior art.

In summary, numerous benefits have been described which result from employing the concepts described herein. The foregoing description of the one or more forms has been presented for purposes of illustration and description. It is not intended to be exhaustive or limiting to the precise form disclosed. Modifications or variations are possible in light of the above teachings. The one or more forms were chosen and described in order to illustrate principles and practical application to thereby enable one of ordinary skill in the art to utilize the various forms and with various modifications as are suited to the particular use contemplated. It is intended that the claims submitted herewith define the overall scope.

All patents, patent applications, publications, or other disclosure material mentioned herein, are hereby incorporated by reference in their entirety as if each individual reference was expressly incorporated by reference respectively. However, none of the patents, patent applications, publications, or other disclosure material mentioned herein are admitted to be prior art. All references, and any material, or portion thereof, that are said to be incorporated by reference herein are incorporated herein only to the extent that the incorporated material does not conflict with existing definitions, statements, or other disclosure material set forth in this disclosure. As such, and to the extent necessary, the disclosure as set forth herein supersedes any conflicting material incorporated herein by reference and the disclosure expressly set forth in the present application controls.

What is claimed is:

1. A method for personalizing a transaction via a blockchain network, the method comprising:
   receiving, via a payment network, an application programming interface ("API") call from a computing device of a user, wherein the API call comprises a private key, a public key, and a unique identifier;
   detecting, via the payment network, a non-fungible token ("NFT") on the blockchain network based on the public key;
   authenticating, via the payment network, the NFT on the blockchain network;
   storing, via the payment network, an NFT asset associated with the NFT, the private key, the public key, and the unique identifier, based on a successful authentication of the NFT;
   associating, via the payment network, the unique identifier with the NFT based on the successful authentication of the NFT; and
   transmitting, via the payment network, the NFT asset, wherein the NFT asset is configured for use in association with a transaction associated with the unique identifier.

2. The method of claim 1, further comprising continuously authenticating, via a server component of the payment network, the NFT after the private key, the public key, and the unique identifier have been stored.

3. The method of claim 2, further comprising:
   detecting, via the payment network, that the user no longer owns the NFT; and disassociating, via the payment network, the unique identifier from the NFT for future transactions associated with the unique identifier.

4. The method of claim 3, further comprising transmitting, via the payment network, a notification to the computing device indicating that the NFT asset can no longer be used with the unique identifier disassociated from the NFT.

5. The method of claim 1, wherein the API call is a first API call, and wherein the method further comprises:

receiving, via the payment network, a second API call comprising a transaction request associated with the unique identifier from a merchant device;

confirming, via the payment network, that the unique identifier is associated with the NFT asset;

confirming, via the payment network, that the NFT asset is stored by the payment network; and transmitting, via the payment network, the NFT asset for presentation via the merchant device.

6. The method of claim 5, further comprising presenting, via an acceptance device, the NFT asset in response to an authorization of the transaction request by an issuer system.

7. The method of claim 1, wherein the NFT asset comprises a multimedia object.

8. The method of claim 7, wherein the NFT asset is configured for at least one of playing an audible component of the multimedia object on a speaker or displaying a visual component of the multimedia object on a display.

9. The method of claim 1, wherein the unique identifier comprises a personal account number ("PAN") associated with a payment card of the user.

10. The method of claim 7, wherein the NFT asset is configured for displaying a visual component of the multimedia object on a virtual representation of a payment card of the user via a display.

11. A payment network configured to personalize a transaction via a blockchain network, the payment network comprising:

a database; and a server comprising a processor and a memory configured to store an application program interface ("API") and instructions that, when executed by the processor, cause the payment network to:

receive an API call from a computing device of a user, wherein the API call comprises a private key, a public key, and a unique identifier associated with a payment device of the user;

detect a non-fungible token ("NFT") on the blockchain network based on the public key;

authenticate the NFT on the blockchain network;

store an NFT asset associated with the NFT, the private key, the public key, and the unique identifier in the database based on a successful authentication of the NFT;

associate the unique identifier with the NFT based on the successful authentication of the NFT; and transmit the NFT asset to the computing device of the user, wherein the NFT asset is configured for use in association with a transaction associated with the payment device.

12. The payment network of claim 11, wherein, when executed by the processor, the API and instructions further cause the processor to continuously authenticate the NFT after the private key, the public key, and the unique identifier have been stored in the database.

13. The payment network of claim 12, wherein, when executed by the processor, the API and instructions further cause the processor to:

detect that the user no longer owns the NFT; and disassociate the unique identifier from the NFT for future transactions associated with the payment device.

14. The payment network of claim 12, wherein the API call is a first API call, and wherein, when executed by the processor, the API and instructions further cause the processor to:

receive a second API call comprising a transaction request associated with the unique identifier from a merchant device;

confirm that the unique identifier is associated with the NFT asset;

confirm that the NFT asset is stored by the payment network; and transmit the NFT asset for presentation via the merchant device.

15. The payment network of claim 11, wherein the NFT asset comprises a multimedia object.

16. The payment network of claim 15, wherein the NFT asset is configured for at least one of playing an audible component of the multimedia object on a speaker or displaying a visual component of the multimedia object on a display.

17. The payment network of claim 15, wherein the NFT asset is configured for displaying a visual component of the multimedia object on a virtual representation of the payment device of the user via a display.

18. A system for personalizing a transaction via a blockchain network, the system comprising:

a computing device of a user; and a payment network comprising:

a database; and a server comprising a processor and a memory configured to store an application program interface ("API") and instructions that, when executed by the processor, cause the payment network to:

receive an API call from a computing device of a user, wherein the API call comprises a private key, a public key, and a unique identifier associated with a payment device of the user;

detect a non-fungible token ("NFT") on the blockchain network based on the public key;

authenticate the NFT on the blockchain network;

store an NFT asset associated with the NFT, the private key, the public key, and the unique identifier in the database based on a successful authentication of the NFT;

associate the unique identifier with the NFT based on the successful authentication of the NFT; and transmit the NFT asset, wherein the NFT asset is configured for use in association with a transaction associated with the payment device.

19. The system of claim 18, wherein the NFT asset comprises a multimedia object.

20. The system of claim 19, wherein the NFT asset is configured for at least one of playing an audible component of the multimedia object on a speaker or displaying a visual component of the multimedia object on a display.

* * * * *